(12) United States Patent
Grant et al.

(10) Patent No.: US 12,280,870 B2
(45) Date of Patent: Apr. 22, 2025

(54) METHOD(S) AND SYSTEM(S) FOR ENABLING AUGMENTED REALITY SCOUTING OF AN AGRICULTURAL FIELD

(71) Applicant: Deere & Company, Moline, IL (US)

(72) Inventors: Elliott Grant, Woodside, CA (US); Zhiqiang Yuan, San Jose, CA (US); Bodi Yuan, Sunnyvale, CA (US)

(73) Assignee: Deere & Company, Moline, IL (US)

( * ) Notice: Subject to any disclaimer, the term of this patent is extended or adjusted under 35 U.S.C. 154(b) by 357 days.

(21) Appl. No.: 17/717,845

(22) Filed: Apr. 11, 2022

(65) Prior Publication Data

US 2023/0320250 A1  Oct. 12, 2023

(51) Int. Cl.
| | | |
|---|---|---|
| B64C 39/02 | (2023.01) | |
| A01B 79/00 | (2006.01) | |
| A01B 79/02 | (2006.01) | |
| B64U 101/30 | (2023.01) | |
| G02B 27/01 | (2006.01) | |
| G06N 5/04 | (2023.01) | |
| G06T 19/00 | (2011.01) | |
| G06V 10/25 | (2022.01) | |
| G06V 20/10 | (2022.01) | |

(Continued)

(52) U.S. Cl.
CPC .......... *B64C 39/024* (2013.01); *A01B 79/005* (2013.01); *A01B 79/02* (2013.01); *G02B 27/0101* (2013.01); *G02B 27/017* (2013.01); *G06N 5/04* (2013.01); *G06T 19/006* (2013.01); *G06V 10/25* (2022.01); *G06V 20/17* (2022.01); *G06V 20/188* (2022.01); *G06V 20/20* (2022.01); *B64U 2101/30* (2023.01); *B64U 2201/10* (2023.01); *G02B 2027/014* (2013.01); *G02B 2027/0141* (2013.01); *G06T 2219/004* (2013.01)

(58) Field of Classification Search
None
See application file for complete search history.

(56) References Cited

U.S. PATENT DOCUMENTS

| | | | |
|---|---|---|---|
| 2018/0075545 A1* | 3/2018 | Richt | G06V 20/188 |
| 2019/0139225 A1* | 5/2019 | Wang | G06V 10/507 |
| 2022/0129673 A1* | 4/2022 | Yaroshenko | G06V 20/188 |

FOREIGN PATENT DOCUMENTS

WO   WO-2018027242 A1 *  2/2018  ............... B25J 9/00

* cited by examiner

*Primary Examiner* — Matthew G Marini
(74) *Attorney, Agent, or Firm* — HANLEY, FLIGHT & ZIMMERMAN, LLC

(57) ABSTRACT

Implementations are directed to generating a stream of agricultural annotations with respect to area(s) of interest of an agricultural field, and providing the stream of agricultural annotations for presentation to the user in an augmented reality manner with respect to the area(s) of interest. In some implementations, a stream of vision data may be received at a first computing device of the user and from a second computing device of the user. Further, the first computing device may process the stream of vision data to generate the stream of agricultural annotations. Moreover, the first computing device may transmit the stream of agricultural annotations to the second computing device to cause the stream of agricultural annotations to be provided for presentation to the user. In other implementations, the first computing device may be omitted, and the second computing device may be utilized to generate the stream of agricultural annotations.

20 Claims, 9 Drawing Sheets

(51) Int. Cl.
*G06V 20/17* (2022.01)
*G06V 20/20* (2022.01)

METHOD(S) AND SYSTEM(S) FOR ENABLING AUGMENTED REALITY SCOUTING OF AN AGRICULTURAL FIELD

BACKGROUND

Agricultural conditions can rapidly change at a localized and regional level, with some changes resulting in healthier crops and other changes resulting in degradation of agricultural environments. In some instances, pests can damage certain areas of crops without warning or recognition by those persons tasked with overseeing such areas—and despite such pests typically having an observable origin. In other instances, crops can reap benefits from weather that is moving through a region, and such crops may be able to leverage certain benefits from the weather, at least with prior preparation relative to the weather.

Although overhead imagery (e.g., satellite imagery or drone imagery) can be helpful for monitoring these variations in an agricultural environment, this overhead imagery may lack precise data, e.g., at the individual row or plant level, which otherwise could be harnessed to increase agricultural yields. Further, many robots (also referred as "rovers") and/or stationary vision components can also be helpful for monitoring these variations at the individual row or plant level in an agricultural environment (e.g., robot imagery or stationary imagery). In many instances, inferences can be made about the individual rows or plants based on this imagery and/or other non-image based information (e.g., weather patterns). However, those persons tasked with overseeing such areas may not be able to readily view these variations while physically present at the individual row or plant level even when leveraging this overhead imagery or these robots.

SUMMARY

Implementations described herein relate to generating a stream of agricultural annotations with respect to one or more areas of interest of an agricultural field that is captured in a stream of vision data, and providing the stream of agricultural annotations for presentation to the user with respect to the one or more areas of interest. In some implementations, the stream of vision data may be received at a first computing device of a user and from a second computing device of the user. In these implementations, the stream of vision data may be generated by one or more vision components of the second computing device. Further, computational resources of the first computing device may be utilized to process the stream of vision data, using one or more inference machine learning (ML) models, to generate the stream of agricultural annotations. These implementations may be particularly advantageous when, for example, the second computing device does not have sufficient computational resources and/or memory to process the stream of vision data. Moreover, the first computing device may transmit the stream of agricultural annotations back to the second computing device to cause the second computing device to provide, for presentation to the user via a display of the second computing device, the stream of agricultural annotations with respect to the one or more areas of interest.

In other implementations, the first computing device described above may be omitted. In these implementations, the stream of vision data may be generated by one or more vision components of the second computing device, computational resources of the second computing device may be utilized to process the stream of vision data, using one or more inference ML models, to generate the stream of agricultural annotations, and the stream of agricultural annotations with respect to the one or more areas of interest may be provided for presentation to the user via the display of the second computing device. These implementations may be particularly advantageous when, for example, the second computing device has sufficient computational resources and/or memory to process the stream of vision data.

For example, assume a human operator (e.g., also referred to herein as "a user") is walking through an agricultural field. Further assume that the user is carrying a mobile phone or mobile tablet (e.g., the first computing device), and further assume that the user is wearing a wearable computing device (e.g., the second computing device) that includes one or more vision components and a head-mounted display (HMD) and that is communicatively coupled to the mobile phone or mobile tablet (e.g., via a Bluetooth network). In this example, the one or more vision components of the wearable computing device may continuously generate and transmit the stream of vision data to the mobile phone or mobile tablet in a streaming manner. Notably, the stream of vision data captures a field of view of the one or more vision components, and the field of view of the one or more vision components may dynamically change depending on where the user looks to reflect actual vision of the user.

Further, the mobile phone or mobile tablet may continuously process the stream of vision data to generate the stream of agricultural annotations, and transmit the stream of agricultural annotations back to the wearable computing device in a streaming manner. Accordingly, the wearable computing device can augment one or more areas of interest in the field of view of the one or more vision components at the HMD of the wearable computing device such that it appears, from a perspective of the user, that the actual vision of the user is augmented with the stream of agricultural annotations via the HMD, thereby providing the user with more information with respect to the one or more areas of interest that may otherwise not be readily apparent to the user with the naked eye. In another example, the wearable computing device may have sufficient computing resources such that the use of the mobile phone or mobile tablet may be omitted.

In some implementations, the stream of agricultural annotations can include, for example, a corresponding bounding box that encompasses each of the one or more areas of interest, a corresponding label associated with an inference made for each of the one or more areas of interest, a corresponding predicted measure associated with the inference made for each of the one or more areas of interest, a corresponding label associated with the inference made for each of the one or more areas of interest, and/or other information. Continuing with the above example, further assume that a group of one or more weeds is captured in the field of view of the one or more vision components as the user is walking through the agricultural field. Further assume that the one or more inference ML models include at least a weed detection ML model that is trained to detect presence of the one or more weeds in the agricultural field and type of the one or more weeds in the agricultural field (e.g., a benign weed, an herbicide resistant weed, etc.). In this example, the one or more areas of interest may correspond to locations in the field of view of the one or more vision components that are predicted to correspond to the one or more weeds.

Further, the stream of agricultural annotations may include a corresponding bounding box that identifies the encompasses a corresponding weed of the one or more weeds. The stream of agricultural annotations may further include a corresponding label indicative of what the area of interest is predicted to include, such as a corresponding label of "benign weed" and a corresponding label of "herbicide resistant weed". The stream of agricultural annotations may further include a corresponding predicted measure (e.g., a binary value, a probability, a log likelihood, and/or other predicted measure) indicative of how likely the area of interest includes the one or more weeds, such as a corresponding predicted measure of 0.50 that the area of interest encompassed by the corresponding bounding box includes a "benign weed" and a corresponding predicted measure of 0.50 that the area of interest encompassed by the corresponding bounding box includes a "herbicide resistant weed". Accordingly, even if the user walking through the field did not see this group of one or more weeds with the naked eye, techniques described herein enable the user to more quickly and efficiently identify the group of one or more weeds while physically present in the agricultural field.

In some implementations, the user may be prompted to reduce a distance between the second computing device and the one or more areas of interest. The user may be prompted to reduce the distance between the second computing device and the one or more areas of interest based on, for example, a corresponding predicted measure associated with an inference made for each of the one or more areas of interest failing to satisfy a predicted measure threshold. Continuing with the above example, assume a corresponding predicted measure of 0.50 that the area of interest encompassed by the corresponding bounding box includes a "benign weed" and a corresponding predicted measure of 0.50 that the area of interest encompassed by the corresponding bounding box includes a "herbicide resistant weed" causes the user to be prompted to reduce the distance between the second computing device and the area of interest associated with these corresponding predicted measures based on 0.50 failing to satisfy a predicted measure threshold. These corresponding predicted measures indicate, for instance, that there is a 50% chance the weed is a benign weed and that there is a 50% chance the weed is an herbicide resistant weed. Accordingly, in this example, the user may be prompted to reduce the distance between the second computing device and the one or more areas of interest via the first computing device and/or the second computing device.

Notably, as the user reduces the distance between the second computing device and the one or more areas of interest, the stream of agricultural annotations provided for presentation to the user may be updated in a streaming manner. Put another way, as the user approaches the area of interest that includes the weed in question, techniques may update the corresponding predicted measures, included in the stream of agricultural annotations, to indicate whether the weed is more likely to be a benign weed of herbicide resistant weed based on further processing of the stream of vision data that captures the area of interest. For instance, as the user approaches the area of interest that includes the weed in question, the HMD of the wearable computing device may dynamically adapt these corresponding predicted measure to indicate a corresponding predicted measure of 0.25 that the area of interest encompassed by the corresponding bounding box includes a "benign weed" and a corresponding predicted measure of 0.75 that the area of interest encompassed by the corresponding bounding box includes a "herbicide resistant weed" based on the further processing of the stream of vision data.

In some implementations, the user may be prompted to cause a robot to perform one or more agricultural operations with respect to the one or more areas of interest that, when selected by the user, causes the robot to perform the one or more agricultural operations with respect to the one or more areas of interest. The user may be prompted to cause the robot to perform the one or more agricultural operations based on, for example, a corresponding predicted measure associated with an inference made for each of the one or more areas of interest. The prompt may include, for example, the one or more agricultural operations that are capable of being performed with respect to the inferences made in processing the stream of vision data (e.g., a first set of agricultural operations to address the presence of weeds, a second set of agricultural operations to address the presence of pests, etc.).

Continuing with the above example, assume a corresponding predicted measure of 0.75 that the area of interest encompassed by the corresponding bounding box includes a "herbicide resistant weed" causes the user to be prompted with one or more agricultural operations that may be performed by a robot with respect to the herbicide resistant weed. The one or more agricultural operations can include, for example, a spraying agricultural operation that, when selected, causes a robot to perform a spraying agricultural operation with respect to the area of interest, a weeding agricultural operation that, when select, causes a robot to perform a weed removal operation with respect to the area of interest, and/or other agricultural operations to address the weed that is predicted to a be a herbicide resistant wee located in the area of interest. Notably, that robot that performed the agricultural operation may be a single robot can perform each of these agricultural operations (e.g., a single robot capable of performing the spraying agricultural operation, the weeding agricultural operation, etc.), or multiple robots that each perform a dedicated one of the agricultural operations (e.g., a spraying robot capable of performing the spraying agricultural operation, a weeding robot capable of performing the weeding agricultural operation, etc.).

In some versions of those implementations, and assuming that user input is received responsive to the prompt, an indication of the one or more agricultural operations to be performed with respect to the area of interest and an indication of location data associated with the one or more areas of interest may be transmitted to the robot. The location data may be generated by one or more sensors of the first computing device and/or the second computing device, and may include, for example, GPS data that is indicative of a location of the one or more areas of interest, a relative location of the one or more areas of interest with respect to a local mapping of the agricultural field, and/or other location data that the robot can utilize to traverse through the agricultural field and to the one or more areas of interest. In response to receiving the indication of the one or more agricultural operations to be performed with respect to the area of interest and the indication of the location data associated with the one or more areas of interest, the robot may traverse through the agricultural field and to the one or more areas of interest, and may, upon arriving at the one or more areas of interest, perform the one or more agricultural operations selected by the user. In some further versions of those implementations, the robot may perform one or more verification steps to verify that the robot has, in fact, arrived at the one or more areas of interest, and/or to verify that the one or more areas of interest do, in fact, have the inference made with respect to processing the stream of vision data.

These one or more verification steps can be utilized as feedback for updating the one or more inference ML models.

In some implementations, the first computing device and/or the second computing device may transmit, to a remote server, the stream of agricultural annotations. The remote server may host a software application associated with augmented reality scouting that enables the user or additional users to subsequently view the stream of agricultural annotations. For instance, the software application may enable the user or the additional users to view image frames and/or video frames that capture the one or more areas of interest, inferences made with respect to the one or more areas of interest, corresponding timestamps that the inferences were made with respect to the one or more areas of interest, agricultural operations that were performed with respect to the one or more areas of interest, locations of the one or more areas of interest in the agricultural field, and/or any other information associated with the one or more areas of interest.

In some versions of those implementations, the first computing device and/or the second computing device may transmit the stream of agricultural annotations to the remote server as the stream of agricultural annotations are generated (e.g., in a synchronous manner), such as when the first computing device and/or the second computing device have a network connection with the remote server while the user is located in the agricultural field. In additional or alternative versions of those implementations, the first computing device and/or the second computing device may store the stream of agricultural annotations in corresponding on-device storage, and may subsequently transmit the stream of agricultural annotations to the remote server as the stream of agricultural annotations upon detecting a network connection with the remote system (e.g., in an asynchronous manner), such as when the first computing device and/or the second computing device does not have a network connection with the remote server while the user is located in the agricultural field.

In additional or alternative implementations, a robot may provide an indication of the one or more areas of interest of the agricultural field. The robot may process, using the one or more inference ML models, a stream of vision data generated by one or more vision components of the robot to make one or more inferences with respect to one or more areas of interest. Further, the robot can determine location data associated with respect to the one or more areas of interest. Moreover, the robot may transmit an indication of the one or more areas of interest along with the location data to enable the user to further investigate the one or more areas of interest in-person. For instance, a rover that is traversing through rows of the agricultural field may process a stream of vision data generated by one or more vision components of the rover to identify a group of one or more weeds in the agricultural field that corresponds one or more areas of interest, and transmit an indication that there is a group of one or more weeds at a particular location in the agricultural field. Also, for instance, an unmanned aerial vehicle (UAV) flying over the agricultural field may process a stream of vision data generated by one or more vision components of the UAV to identify a group of one or more weeds in the agricultural field that corresponds one or more areas of interest, and transmit an indication that there is a group of one or more weeds at a particular location in the agricultural field.

In these instances, the indication of the one or more areas of interest may include directions from a current location of the first computing device and/or the second computing device to the one or more areas of interest. Put another way, various robots may be utilized to monitor for variations across the agricultural field, but instruct the user to further investigate the one or more areas of interest. The directions can include, for example, an indication of a corresponding location of the one or more areas of interest with respect to a local mapping of the agricultural field (e.g., "check along row 2 of the northwest cornfield for suspected weeds") or turn-by-turn directions that are provided for presentation at the HMD of the second computing device (e.g., "turn right and proceed straight for 100 feet") that are updated as the user navigates to the corresponding location of the one or more areas of interest.

Although the above example is described with respect to the one or more areas of interest including the group of one or more weeds, is described with respect to the one or more inference ML models including the weed detection ML model, and is described with respect to particular agricultural operations that may be performed, it should be understood that is for the sake of example and is not meant to be limiting. Rather, it should be understood that the one or more areas of interest may correspond to any variation in an agricultural field that may be detected using the one or more inference ML models. For example, it should be understood that the one or more inference ML models may additionally, or alternatively, include a pest detection ML model that is trained to detect presence of pests in the agricultural field, a growth-stage classifier ML model that is trained to classify plant-parts-of-interest into stages of growth, a disease detection ML model that is trained to detect presence of one or more diseases of one or more crops in the agricultural field, a crop yield prediction ML model that is trained to predict crop yield of one or more crops in the agricultural field, and/or any other inference ML model that may be utilized to make one or more inferences with respect to agriculture.

Further, it should be understood that the one or more agricultural operations presented to the user may depend on the inferences made by the one or more inference ML models. For example, it should be understood that the one or more agricultural operations may additionally, or alternatively, include a harvesting agricultural operation, an irrigation agricultural operation, a mowing agricultural operation, a pruning agricultural operation, a seeding agricultural operation, and/or any other agricultural operation that may be performed by a robot based on the inferences made by the one or more inference ML models.

Moreover, although the implementations described above are described with respect to operations being performed by the first computing device and/or the second computing device, it should also be understood that is not meant to be limiting. For example, and as noted above, the wearable computing device (e.g., the second computing device) may have sufficient computing resources such that the use of the mobile phone or mobile tablet (e.g., the first computing device) may be omitted. Also, for example, a remote server may be utilized in addition to, or lieu of, the first computing device. However, it should be understood that utilization of the remote server may introduce additional latency that detracts from the user experience and/or may be more prone to failure due to connectivity issues that may occur when the user is physically present in an agricultural field.

By using techniques described herein, one or more technological advantages may be achieved. As one non-limiting example, techniques described herein enable actual vision of a human operator to be supplemented through presentation of a stream of agricultural annotations while the human operator is physically present in an agricultural field.

Accordingly, the human operator may be able to more quickly and efficiently identify variations in the agricultural field, and cause some action to be performed to address these variations (e.g., cause a robot to perform one or more agricultural operations). As a result, crops of the agricultural field may not be subject to devastation due to these variations and/or may produce a higher yield since the human operator can quickly and efficiently dispatch a robot to address these variations. As another non-limiting example, techniques described herein enable natural resources that are consumed by robots in monitoring for these variations to be reduced. For example, these variations may be detected while the human operators are physically present in the agricultural field and not necessarily monitoring for these variations. Nonetheless, these variations may still be detected, and robots that are utilized in maintaining the agricultural field can be selectively dispatched to one or more areas of interest of the agricultural field rather than consuming natural resources associated with monitoring for these variations.

The above description is provided as an overview of only some implementations disclosed herein. Those implementations, and other implementations, are described in additional detail herein.

DETAILED DESCRIPTION

Figure 1:
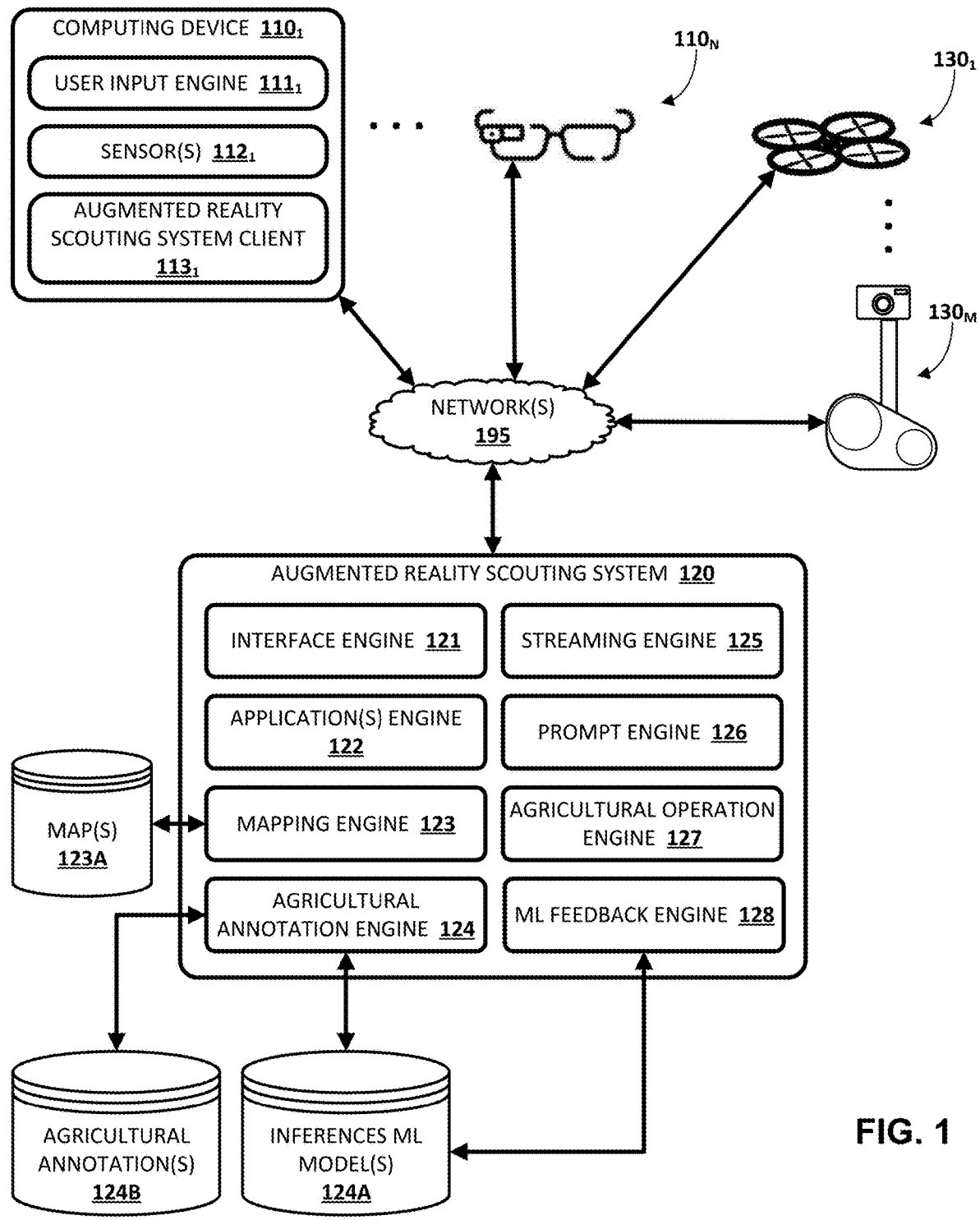
FIG. 1 depicts a block diagram of an example environment that demonstrates various aspects of the present disclosure, and in which implementations disclosed herein can be implemented.

Turning now to FIG. 1, an environment in which one or more selected aspects of the present disclosure may be implemented is depicted. The example environment includes a plurality of computing devices $110_{1-N}$, an augmented reality scouting system 120, and a plurality of robots $130_{1-M}$. The augmented reality scouting system 120 is an example of an information processing and retrieval system in which the systems, components, and techniques described herein may be implemented and/or with which systems, components, and techniques described herein may interface. Although the augmented reality scouting system 120 is depicted as being separate from the components $110_{1-N}$, 120, and $130_{1-M}$, it should be understood that is for the sake of illustration and is not meant to be limiting. Rather, it should be understood that the augmented reality scouting system 120 may be implemented locally at any of the components $110_{1-N}$, 120, and $130_{1-M}$, and/or across multiple of the components $110_{1-N}$, 120, and $130_{1-M}$ in a distributed manner.

In various implementations, an individual (which in the current context may also be referred to as a "human operator" or "user") may operate one or more of the computing devices $110_{1-N}$ to interact with other components depicted in FIG. 1 (which in the current context may also be referred to as a "client devices $110_{1-N}$"). The computing devices $110_{1-N}$ may be, for example, a desktop computing device, a laptop computing device, a tablet computing device, a mobile phone computing device, a computing device of a vehicle of the participant (e.g., an in-vehicle communications system, an in-vehicle entertainment system, an in-vehicle navigation system), a standalone interactive speaker (with or without a display), or a wearable apparatus that includes a computing device, such as a head-mounted display ("HMD") that provides an augmented reality ("AR") and/or virtual reality ("VR") immersive computing experience, a smart watch, and so forth. Additional and/or alternative computing devices may be provided.

Each of the components $110_{1-N}$, 120, and $130_{1-M}$ may include one or more memories for storage of data and software applications, one or more processors for accessing data and executing applications, and other components that facilitate communication over one or more of networks 195, such as various network interfaces to communicate over one or more local area networks ("LANs", such as a Wi-Fi network, a Bluetooth network, and/or any other LAN), one or more wide area network ("WANs", such as the Internet and/or any other WAN), and/or one or more other networks. The operations performed by one or more of the components $110_{1-N}$, 120, and $130_{1-M}$ may be implemented locally at one or more of the components $110_{1-N}$, 120, and $130_{1-M}$ and/or distributed across multiple computer systems. For example, the augmented reality scouting system 120 may be implemented as, for example, computer programs running on one or more computers in one or more locations that are coupled to each other through one or more of the networks 195.

Each of the computing devices $110_{1-N}$ may operate a variety of different components that may be used, for instance, to generate and/or view a stream of agricultural annotations with respect to one or more areas of interest of an agricultural field as described herein. For example, a first computing device $110_1$ may include user input engine $111_1$ to detect and process user input (e.g., spoken input, typed input, and/or touch input) directed to the first computing device $110_1$. As another example, the first client device $110_1$ may include a plurality of sensors $112_1$ to generate corresponding sensor data. The plurality of sensors may include, for example, global positioning system ("GPS") sensors to generate location data capturing GPS coordinates, one or more vision components (e.g., cameras, LIDAR, etc.) to generate a stream of vision data, one or more microphones to generate a stream audio data based on spoken input directed to the first computing device $110_1$ and detected via the user input engine $111_1$, and/or other sensors to generate corresponding audio data. As yet another example, the first computing device $110_1$ may operate an augmented reality scouting system client $113_1$ (e.g., which may be standalone or part of another application, such as part of a web browser) to interact with the augmented reality scouting system 120.

Further, a second computing device $110_N$ may take the form of an HMD that is configured to render two-dimensional ("2D") and/or three-dimensional ("3D") data to a wearer as part of an AR and/or VR immersive computing experience. For example, the wearer of the second computing device $110_N$ may be presented with 3D point clouds representing various aspects of information and/or objects of interest, such as crops, fruits of crops, particular portions of an agricultural field, and so on in a virtual reality manner. As another example, the wearer of the second computing device $110_N$ may be presented with 2D and/or 3D point clouds that overlay an actual field of vision of the wearer representing the various aspects of information and/or objects of interest in an augmented reality manner. Although not depicted, the second computing device $110_N$ may include the same or similar components as the first computing device $110_N$. For example, the second computing device $110_N$ may include respective instances of a user input engine to detect and process user input, a plurality of sensors to generate corresponding sensor data, and/or an augmented reality scouting system client to interact with the augmented reality scouting system 120.

In various implementations, the augmented reality scouting system 120 may include user interface engine 121, application(s) engine 122, mapping engine 123, agricultural annotation engine 124, streaming engine 125, prompt engine 126, agricultural annotation engine 127, and ML feedback engine 128 as shown in FIG. 1. In some implementations one or more of engines 121, 122, 123, 124, 125, 126, 127, and/or 128 may be omitted. In some implementations all or aspects of one or more of engines 121, 122, 123, 124, 125, 126, 127, and/or 128 may be combined. In some implementations, one or more of engines 121, 122, 123, 124, 125, 126, 127, and/or 128 may be implemented in a component that is separate from the augmented reality scouting system 120. In some implementations, one or more of engines 121, 122, 123, 124, 125, 126, 127, and/or 128, or any operative portion thereof, may be implemented in a component that is executed, in part or exclusively, by one or more of the computing devices $110_{1-N}$.

The augmented reality scouting system 120 may be utilized to generate a stream of agricultural annotations with respect to area(s) of interest of an agricultural field, and provide the stream of agricultural annotations for presentation to the user in an augmented reality manner with respect to the area(s) of interest. As used herein, an area of interest of an agricultural field may refer to any portion of an agricultural field, such as soil, crops, rows of crops, a field that includes rows of crops, and so on, that is identified (e.g., based on processing a stream of vision data that captures the area of interest) as including some information, object, and/or other variation that may be of interest to the user. Further, as used herein, agricultural annotations may refer to data determined based on inferences made with respect to an area of interest (e.g., based on processing vision data that captures the area of interest), such as a corresponding bounding box that identifies the encompasses the area of interest, a corresponding label indicative of what the area of interest is predicted to include (e.g., an object such as a weed or pest, and/or a condition, such as poor soil or flooded soil), a corresponding predicted measure (e.g., a binary value, a probability, a log likelihood, and/or other predicted measure) indicative of how likely the area of interest includes what it is predicted to include, and/or other information. Moreover, as used herein, a stream of agricultural annotations may refer to a stream of this data that is continually generated and provided for presentation to the in a streaming manner (e.g., based on processing a stream of the vision data that captures the area of interest).

In various implementations, the stream of agricultural annotations may be utilized to augment actual vision of a user (e.g., the wearer of the second computing device $110_N$) such that it appears, from a perspective of the user, that the agricultural annotations are actually present in the agricultural field. Accordingly, while the user is physically present in the agricultural field, the actual vision of the user may be augmented with the stream of agricultural annotations (e.g., as described with respect to FIGS. 5A-5C). The engines 121, 122, 123, 124, 125, 126, 127, and/or 128 of FIG. 1 are described with continued reference to FIG. 2.

Figure 2:
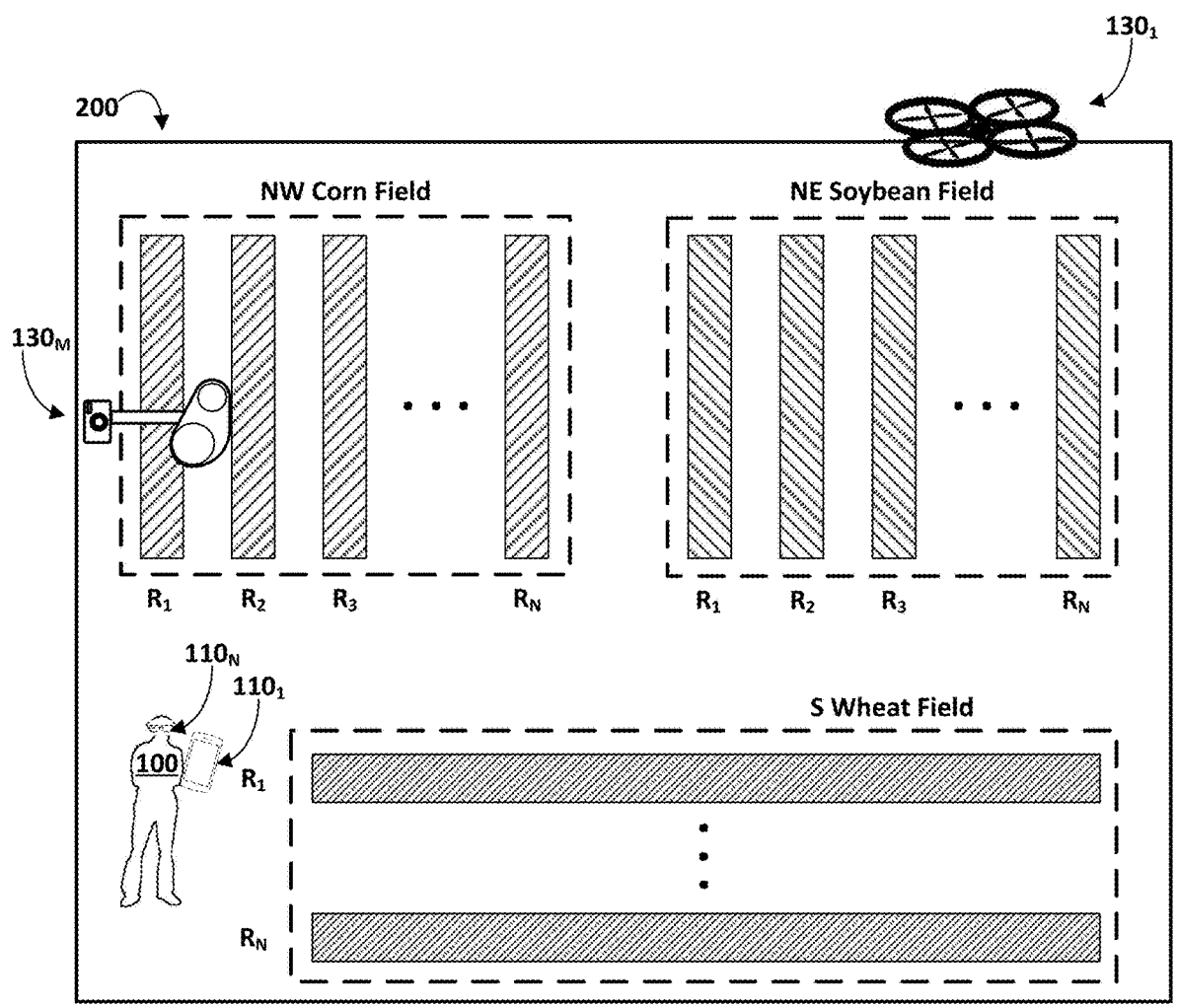
FIG. 2 depicts various non-limiting examples of an agricultural field to illustrate aspects of the present disclosure, in accordance with various implementations.

For example, and referring briefly to FIG. 2, an agricultural field 200 is depicted. For the sake of example, assume that a mapping of the agricultural field 200 is known (e.g., stored in map(s) database that is accessible by the mapping engine 123). The mapping of the agricultural field may refer to, for example, a local mapping of the agricultural field 200 that is defined with respect to a local or relative coordinate system defined by corresponding semantic identifiers, and/or a global mapping of the agricultural field 200 that is defined with respect to a global coordinate system (e.g., longitude and latitude coordinates, GPS coordinates, and/or other global coordinates). In these example, the local or relative coordinate system can be previously generated based at least in part on corresponding semantic identifiers assigned to agricultural plots included in the agricultural field 200 and/or assigned to a plurality of rows of crops included in the agricultural field 200 as shown in FIG. 2, whereas the global coordinate can be previously generated based on previously generated location data.

For example, the local mapping of the agricultural field 200 as shown in FIG. 2 can include a first agricultural plot that is assigned a corresponding semantic identifier of NW (north-west) corn field and that has a plurality of rows assigned corresponding semantic identifiers of first row $R_1$, second row $R_2$, third row $R_3$, and so on through Nth row $R_N$ for the NW corn field; a second agricultural plot that is assigned a corresponding semantic identifier of NE (north-east) soybean field and that has a plurality of rows assigned corresponding semantic identifiers of first row $R_1$, second row $R_2$, third row $R_3$, and so on through Nth row $R_N$ for the NE soybean field; and a third agricultural plot that is assigned a corresponding semantic identifier of S (south) wheat field and that has a plurality of rows assigned corresponding semantic identifiers of first row $R_1$ and so on through Nth row $R_N$ of the S wheat field. In some implementations, the corresponding semantic identifiers assigned to the agricultural plots of the agricultural field 200 and/or the rows of the agricultural plots can be assigned based on user input (e.g., provided by one or more of the client devices $110_{1-N}$ and obtained by the row view system 120 via the user interface engine 121). In additional or alternative implementations, one or more techniques can be utilized to automatically assign the corresponding semantic identifiers assigned to the agricultural plots of the agricultural field 200 and/or the rows of the agricultural plots.

As shown in FIG. 2, assume that a user 100 is physically traversing through the agricultural field while carrying a mobile computing device (e.g., an instance of the first computing device $110_1$ of FIG. 1) and while wearing a wearable computing device with augmented reality capabilities (e.g., an instance of the second computing device $110_N$) that is communicatively coupled to the mobile computing device. In some implementations, one or more vision components of the wearable computing device may continuously generate a stream of vision data that captures an actual field of view of the user 100 that is physically traversing through the agricultural field. The one or more vision components of the wearable computing device may optionally continuously generate the stream of vision data in response to receiving user input (e.g., via an instance of the user interface engine 121) that is directed to a software application associated with the augmented reality scouting system 120 (e.g., via an instance of the application(s) engine 122) to initiate generating of the stream of vision data.

In some versions of those implementations, the wearable computing device may continually transmit the stream of vision data to the mobile computing device in a streaming manner (e.g., via an instance of the interface engine 121). In these implementations, an instance the agricultural annotation engine 123 executing at least in part at the mobile computing device can process, using inference machine learning (ML) model(s) (e.g., stored in the inference ML model(s) database 124A), the stream of vision data to generate a stream of agricultural annotations with respect to an area of interest of the agricultural field 200. The stream of agricultural annotations may be stored in on-device storage (e.g., agricultural annotation(s) database 124B) for subsequent utilization by the software application associated with the augmented reality scouting system 120 (e.g., via the instance of the application(s) engine 122). Further, the stream of agricultural annotations may be transmitted back to the wearable computing device (e.g., enforced via an instance of the streaming engine 125 executing at least in part at the mobile computing device) to cause the stream of agricultural annotations to be provided for presentation to the user 100 via an HMD of the wearable computing device.

In additional or alternative versions of those implementations, the wearable computing device may continually transmit the stream of vision data to a remote server (e.g., not depicted in FIG. 2) in a streaming manner (e.g., via an instance of the interface engine 121). In these implementations, the remote server may process the stream of vision data to generate the stream of agricultural annotations in the same or similar manner described above and without transmitting the stream of vision to the mobile computing device of the user 100 for any subsequent processing (e.g., via an instance the agricultural annotation engine 123 executing at least in part at the remote server). Further, the stream of agricultural annotations may be transmitted back to the wearable computing device (e.g., enforced via an instance of the streaming engine 125 executing at least in part at the remote server) to cause the stream of agricultural annotations to be provided for presentation to the user 100 via an HMD of the wearable computing device. In these implementations the stream of agricultural annotations may optionally be transmitted to the mobile computing device (e.g., via an instance of the interface engine 121) to be provided for display via a display of the mobile computing device.

In additional or alternative versions of those implementations, the wearable computing device may process the stream of vision data to generate the stream of agricultural annotations in the same or similar manner described above and without transmitting the stream of vision to the mobile computing device of the user 100 (e.g., via an instance the agricultural annotation engine 123 executing at least in part at the wearable computing device). In these implementations, an instance of the streaming engine 125 executing at least in part at the wearable computing device may cause the stream of agricultural annotations to be provided for display via an HMD of the wearable computing device. In these implementations the stream of agricultural annotations may optionally be transmitted to the mobile computing device (e.g., via an instance of the interface engine 121) to be provided for display via a display of the mobile computing device.

Notably, as the user 100 continues traversing through the agricultural field 200, the stream of vision data is continually generated and processed to update the stream of agricultural annotations, and those updates are reflected on the HMD of the wearable computing device. As a result, one or more areas of interest and corresponding streams of agricultural annotations for each of the one or more areas of interest may be presented dynamically and in an augmented manner for presentation to the user 100. Accordingly, the user 100 may be able to more quickly and efficiently identify variations in the agricultural field 200.

In various implementations, the user 100 may be prompted to traverse to a particular location in the agricultural field 200 (e.g., via an instance of the prompt engine 126). For example, assume that an unmanned aerial vehicle (UAV) (e.g., an instance of the robot $130_1$ in FIG. 1) is flying over the NE soybean field as depicted in FIG. 2, assume that the UAV includes one or more vision components capable of generating a stream of vision data, and assume that the UAV has access to one or more inference ML models as described herein. In this example, the UAV can cause the stream of vision data to be processed using the one or more inference ML models to identify areas of interest. However, since the UAV is flying the NE soybean and is not capable of and/or configured to inspect areas of interest at the individual row or plant level. Nonetheless, the UAV can generate and transmit an indication of the areas of interest to the user 100 via the mobile computing device and/or the wearable computing device. The indication of the areas of interest can include, for example, directions from a current location of the mobile computing device and/or the wearable computing device to the areas of interest.

For example, further assume that the UAV identifies one or more areas of interest in the NE soybean field. In this example, the UAV can determine location data associated with the one or more areas of interest in the NE soybean field, and transmit the location data associated with the one or more areas of interest in the NE soybean field to the mobile computing device and/or the wearable computing device. Based on the location data, directions from the current location of the user 100 (e.g., west of the S wheat field) to the one or more areas of interest (e.g., located north-east of the user 100 in the NE soybean field). This enables the user 100 to physically inspect the areas of interest, which may be augmented with corresponding streams of agricultural annotations based on the processing described above.

Additionally, or alternatively, a rover (e.g., an instance of the robot 130M in FIG. 1) may include one or more vision components capable of generating a stream of vision data, and may have access to one or more inference ML models as described herein. In this example, the rover can cause the stream of vision data to be processed using the one or more inference ML models to identify the areas of interest, and the user 100 can be prompted in the same or similar manner described above to further investigate the one or more areas of interest.

In various implementations, the user 100 may be prompted to dispatch a robot to cause the robot to perform one or more agricultural operations with respect to one or more areas of interest (e.g., via an instance of the prompt engine 126). For example, the user 100 may have access to a single robot that can perform multiple agricultural operations, multiple robots that each perform a dedicated agricultural operation, or both (e.g., the robots $130_1$-$130_M$ of FIG. 1). The agricultural operations that the user 100 is prompted to cause performance thereof may be based on, for example, capabilities of the robot(s), inferences made with respect to the one or more areas of interest, and/or the one or more inference ML models utilized to process the stream of vision data. In these implementations, an instance of the agricultural operation engine 127 may be utilized to determine which agricultural operations to provide for presentation to the user 100 via the prompt. For example, the agricultural operation engine 127 may utilize a mapping between inferences made by the one or more inference ML models and agricultural operations that may be performed based on the inferences to determine which agricultural operations to provide for presentation to the user 100 via the prompt.

As some non-limiting examples, the one or more inference ML models may include a weed detection ML model that is trained to detect presence of weeds and/or types of weeds in the agricultural field 200, a pest detection ML model that is trained to detect presence of pests and/or types of pests in the agricultural field 200, a growth-stage classifier ML model that is trained to classify plant-parts-of-interest into stages of growth of crops in the agricultural field 200, a disease detection ML model that is trained to detect presence of one or more diseases of one or more crops in the agricultural field 200, a crop yield prediction ML model that is trained to predict crop yield of one or more crops in the agricultural field 200, and/or any other inference ML model that may be utilized to make one or more inferences with respect to agriculture. As some non-limiting examples, the agricultural operations that may be performed based on the one or more inference ML models include a weed removal agricultural operation, a weed spraying agricultural operation, a harvesting agricultural operation, an irrigation agricultural operation, a mowing agricultural operation, a pruning agricultural operation, a seeding agricultural operation, and/or any other agricultural operation that may be performed by the robot(s) based on the inferences made by the one or more inference ML models.

In various implementations, the selection (or lack thereof) of a given agricultural operation that the user is prompted to cause the robot(s) to perform with respect to the one or more areas of interest may be utilized as a feedback signal to update one or more of the inference ML model(s) (e.g., via an instance of the ML feedback engine 128). For example, if a given agricultural operation is selected by the user 100 responsive to the prompt, then the selection can be utilized as a positive feedback signal to positively reinforce inferences made by the one or more inference ML models. Put another way, the user selection of the given agricultural operation may be utilized as a supervision signal that indicates one or more of the inference ML models made a correct inference based on receiving the user selection. Also, for example, if a given agricultural operation is not selected by the user 100 responsive to the prompt, then the lack of any selection can be utilized as a negative feedback signal to negatively reinforce inferences made by the one or more inference ML models. Put another way, the lack of the user selection of the given agricultural operation may be utilized as a supervision signal that indicates one or more of the inference ML models made an incorrect inference based on receiving the user selection. Additionally, or alternatively, the lack of the user selection may not be utilized as a negative feedback signal since the user 100 may have some other reason for not causing the given agricultural operation to be performed.

Although FIG. 2 is depicted as using particular components in a particular arrangement, it should be understood that is for the sake of example and is not meant to be limiting. Further, although FIG. 2 depicts a particular agricultural field, it should be understood that is for the sake of example and is not meant to be limiting. The engines 121, 122, 123, 124, 125, 126, 127, and/or 128 of FIG. 1 are additionally described with continued reference to FIGS. 3 and 4.

Figure 3:
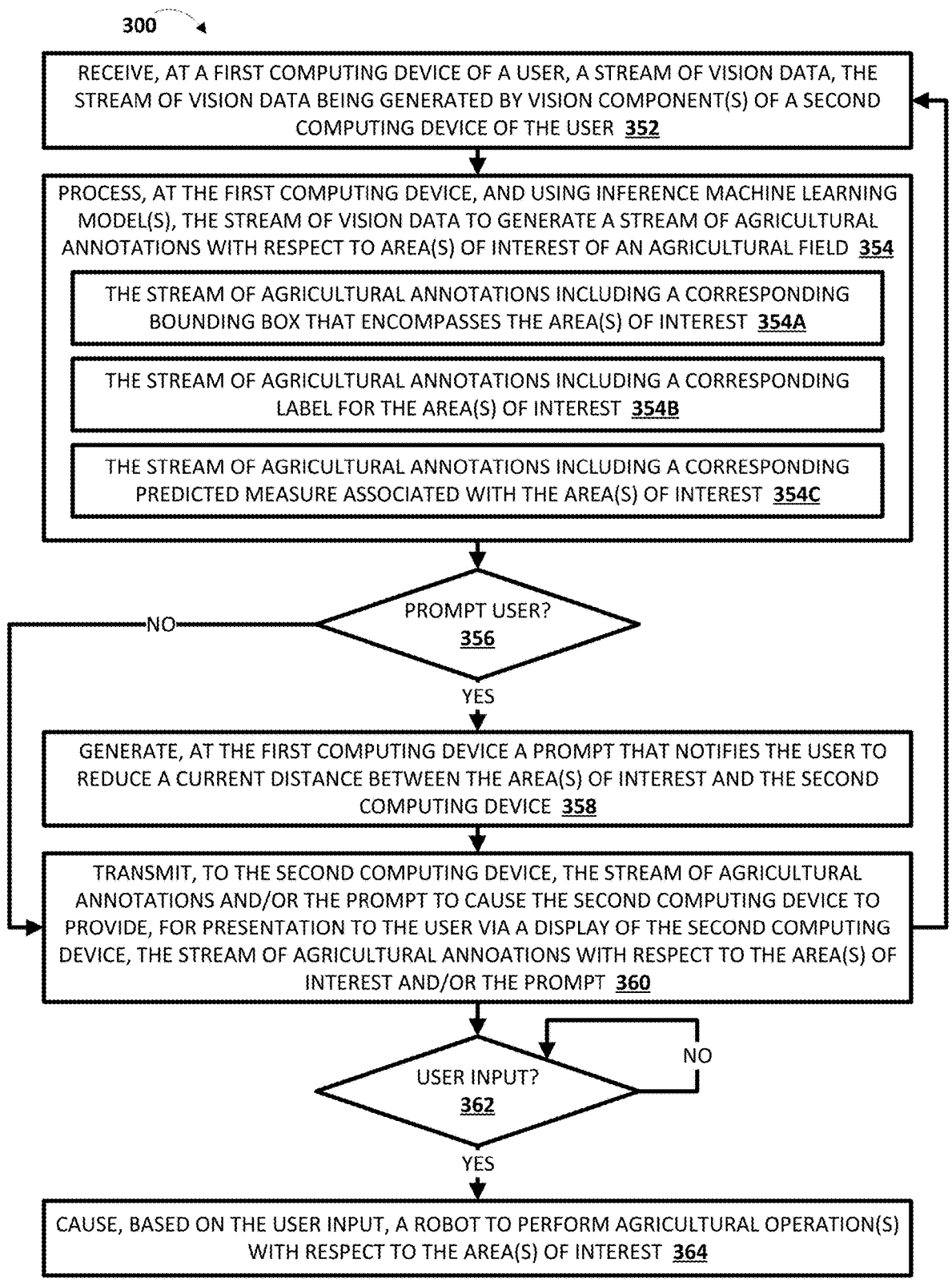
FIG. 3 depicts a flowchart illustrating an example method of implementing an augmented reality scouting system, in accordance with various implementations.

Turning now to FIG. 3, a flowchart illustrating an example method 300 of implementing an augmented reality scouting system is depicted. For convenience, the operations of the method 300 are described with reference to a system that performs the operations. This system of the method 300 includes at least one processor, at least one memory, and/or other component(s) of computing device(s) (e.g., computing device(s) $110_{1-N}$ of FIG. 1, robot(s) $130_{1-M}$ of FIG. 1, augmented reality scouting system 120 of FIG. 1, robot 630 of FIG. 6, computing device 710 of FIG. 7, server(s), and/or other computing devices). Moreover, while operations of the method 300 are shown in a particular order, this is not meant to be limiting. One or more operations may be reordered, omitted, and/or added.

At block 352, the system receives, at a first computing device of a user, a stream of vision data, the stream of vision being generated by one or more vision components of a second computing device of the user. The stream of vision data can include, for example, a stream of image frames and/or video frames corresponding to a field of view of the one or more vision components of the second computing device. The first computing device may be, for example, a mobile computing device of the user, such as a mobile phone or mobile tablet. Further, the second computing device may, for example, be a wearable computing device. These computing devices may be communicatively coupled over one or more LANs, such as a Bluetooth network.

At block 354, the system processes, at the first computing device, and using one or more inference machine learning (ML) models, the stream of vision data to generate a stream of agricultural annotations with respect to one or more areas of interest of an agricultural field. The one or more areas of interest may be, for example, a subset of the field of vision of the one or more vision components. The stream of agricultural annotations can include a stream of data associated with object(s) and/or conditions(s) captured in the one or more areas of interest. For example, and as indicated at block 354A, the stream of agricultural annotations may include a corresponding bounding box that encompasses each of the one or more areas of interest. As another example, and as indicated at block 354B, the stream of agricultural annotations may additionally, or alternatively, include a corresponding label for each of the one or more areas of interest. As yet another example, and as indicated at block 354C, the stream of agricultural annotations may additionally, or alternatively, include a corresponding predicted measure associated with each of the one or more areas of interest. The one or more inference ML models can include, for example, a weed detection ML model that is trained to detect presence of weeds and/or types of weeds in the agricultural field, a pest detection ML model that is trained to detect presence of pests and/or types of pests in the agricultural field, a growth-stage classifier ML model that is trained to classify plant-parts-of-interest into stages of growth of crops in the agricultural field, a disease detection ML model that is trained to detect presence of one or more diseases of one or more crops in the agricultural field, a crop yield prediction ML model that is trained to predict crop yield of one or more crops in the agricultural field, and/or any other inference ML model that may be utilized to make one or more inferences with respect to agriculture.

At block 356, the system determines whether to prompt the user to reduce a current distance between the second computing device and the one or more areas of interest. The system may determine whether to prompt the user to reduce a current distance between the second computing device and the one or more areas of interest based on, for example, the corresponding predicted measures associated with each of the one or more areas of interest failing to satisfy one or more predicted measure thresholds. The one or more predicted measure thresholds may vary based on the one or more inference ML models utilized to generate the corresponding predicted measures. For example, if the corresponding predicted measures generated using a weed detection model determine a corresponding predicted measure of 0.50 that a weed captured in the area of interest is a benign weed and a corresponding predicted measure of 0.50 that the weed captured in the area of interest is an herbicide resistant weed, then the user may be prompted to reduce the current distance between the second computing device and the user (e.g., based on 0.50 failing to satisfy a predicted measure threshold associated with weed detection). However, if the corresponding predicted measures generated using a pest detection model determine a corresponding predicted measure of 0.50 that a pest captured in the area of interest is a first harmful pest and a corresponding predicted measure of 0.50 that the pest captured in the area of interest is a second harmful pest, then the user may not be prompted to reduce the current distance between the second computing device and the user (e.g., based on 0.50 satisfying a predicted measure threshold associated with harmful pest detection).

If, at an iteration of block 356, the system determines to prompt the user to reduce a current distance between the second computing device and the one or more areas of interest, the system may proceed to block 358. At block 358, the system generates, at the first computing device, a prompt that notifies the user to reduce a current distance between the second computing device and the one or more areas of interest. The prompt can be provided for visual and/or audible presentation to the user. The system may proceed to block 360. If, at an iteration of block 356, the system determines not to prompt the user to reduce a current distance between the second computing device and the one or more areas of interest, the system may proceed to block 360 and skip block 358.

At block 360, the system transmits, to the second computing device, the stream of agricultural annotations and/or the prompt to cause the second computing device to provide, for presentation to the user via a display of the second computing device, the stream of agricultural annotations with respect to the one or more areas of interest and/or the prompt. The stream of agricultural annotations can be utilized to augment the display of the second computing device. The system may return to block 352 to continue receiving and processing the stream of vision data through additional iterations of the method 300 of FIG. 3.

At block 362, the system determines whether user input to cause a robot to perform one or more agricultural operations with respect to one or more of the areas of interest has been received. In some implementations, the user input may be proactively provided by the user via spoken input (e.g., detected by the first computing device and/or the second computing device) and/or other types of input. In additional or alternative implementations, the user input may be received responsive to a prompt for the user to select the one or more agricultural operations and/or robot(s) to cause to perform the one or more agricultural operations. The one or more agricultural operations included in the prompt may be based on, for example, the agricultural annotations that are included in stream of agricultural annotations, the one or more inference ML models utilized in generating the stream of agricultural annotations, and/or other information described herein. If, at an iteration of block 362, the system determines that user input to cause a robot to perform one or more agricultural operations with respect to one or more of the areas of interest has not been received, then the system may continue monitoring for user input at block 362. If, at an iteration of block 362, the system determines that user input to cause a robot to perform one or more agricultural operations with respect to one or more of the areas of interest has been received, then the system proceeds to block 364.

At block 364, the system causes, based on the user input, a robot to perform one or more agricultural operations with respect to one or more of the areas of interest. For example, the system can cause one or more robots to be dispatched to perform the one or more agricultural annotations in response to receiving the user selection and/or a next time instance that the robot is traversing or otherwise navigating through the agricultural field.

Although the method 300 of FIG. 3 is described with respect to the system utilizing a particular architecture of computing devices (e.g., the first computing device and the second computing device in a particular manner), it should be understood that is for the sake of example and is not meant to be limiting. For example, the method 300 of FIG. 3 may be implemented exclusively at the second computing device. As another example, the first computing device may be a remote server and data may be transmitted to and/or from the remote server using one or more WANs.

Figure 4:
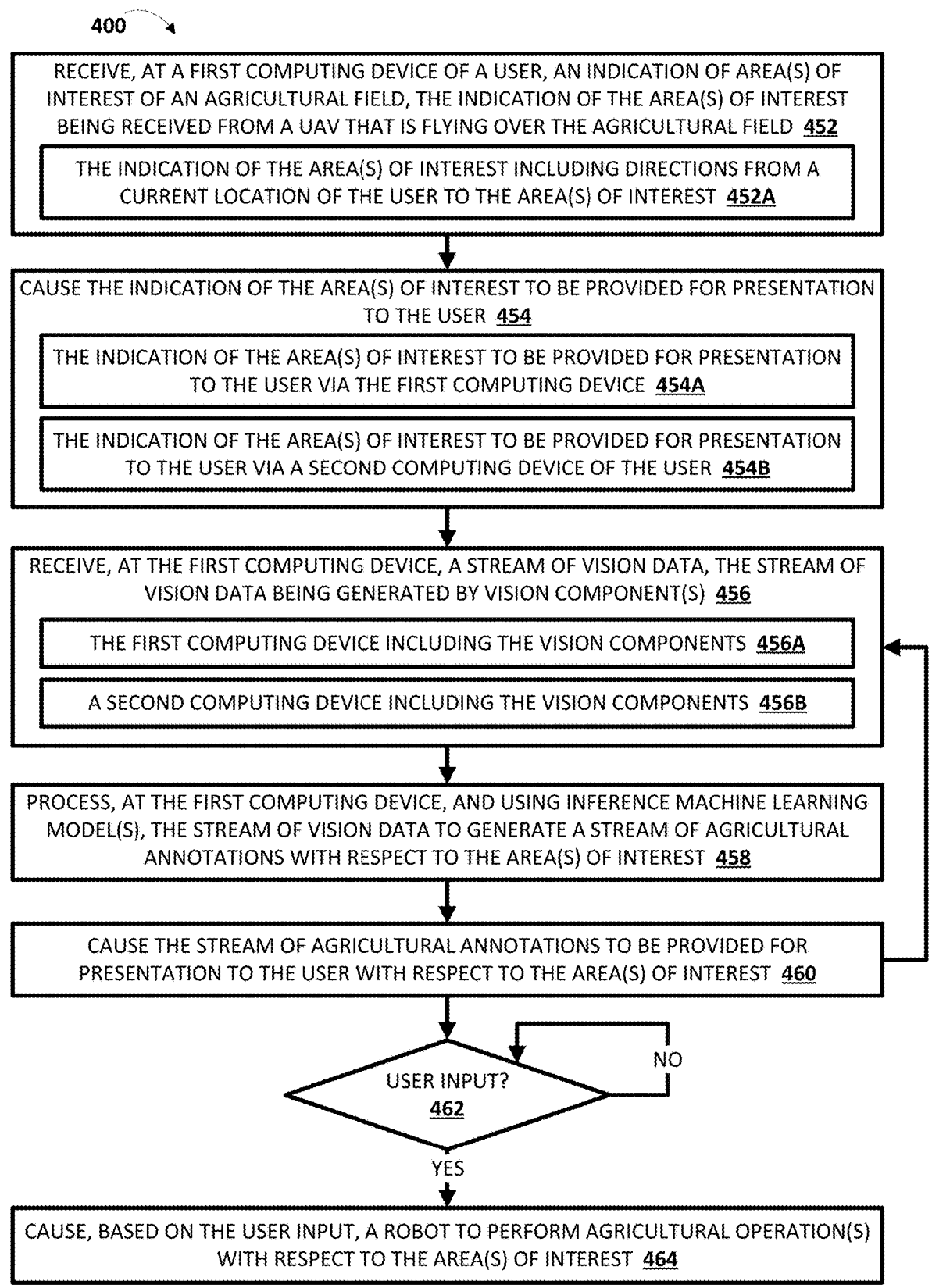
FIG. 4 depicts a flowchart illustrating another example method of implementing an augmented reality scouting system, in accordance with various implementations.

Turning now to FIG. 4, a flowchart illustrating an example method 400 of implementing an augmented reality scouting system is depicted. For convenience, the operations of the method 400 are described with reference to a system that performs the operations. This system of the method 400 includes at least one processor, at least one memory, and/or other component(s) of computing device(s) (e.g., computing device(s) $110_{1-N}$ of FIG. 1, robot(s) $130_{1-M}$ of FIG. 1, augmented reality scouting system 120 of FIG. 1, robot 630 of FIG. 6, computing device 710 of FIG. 7, server(s), and/or other computing devices). Moreover, while operations of the method 400 are shown in a particular order, this is not meant to be limiting. One or more operations may be reordered, omitted, and/or added.

At block 452, the system receives, at a first computing device of a user, an indication of one or more areas of interest of an agricultural field, the indication of the one or more areas of interest being received from an unmanned aerial vehicle (UAV) that is flying over the agricultural field. For example, and as indicated at block 452A, the indication of the one or more areas of interest includes directions from a current location of the user to the one or more areas of interest. The directions from the current location of the user to the one or more areas of interest may be determined based on, for example, location data generated by location sensor(s) of the first computing device and location data generated by the UAV with respect to the one or more areas of interest. The directions can be defined with respect to a local mapping of the agricultural field and/or a global mapping of the agricultural field. The first computing device may be, for example, a mobile phone of the user, a mobile tablet of the user, a wearable computing device of the user, and/or any other computing device that may be utilized by the user while traversing through the agricultural field.

At block 454, the system causes the indication of the one or more areas of interest to be provided for presentation to the user. For example, and as indicated at block 454A, the indication of the one or more areas of interest may be provided for presentation to the user via the first computing device. For instance, the indication of the one or more areas of interest may be provided for presentation to the user via a display of the first computing device that received the indication of the one or more areas of interest at block 452. As another example, and as indicated at block 454B, the indication of the one or more areas of interest may additionally, or alternatively, be provided for presentation to the user via a second computing device of the user. For instance, the indication of the one or more areas of interest may additionally, or alternatively, be transmitted to the second computing device and from the first computing device over one or more networks, and may be provided for presentation to the user via a display of the second computing device that is in addition to the first computing device that received the indication of the one or more areas of interest at block 452.

At block 456, the system receives, at the first computing device, a stream of vision data, the stream of vision data being generated by one or more vision components. For example, and as indicated at block 456A, the first computing device may include the one or more vision components. For instance, the stream of vision data may be generated by the one or more vision components of the first computing device and provided to the system for further processing. As another example, and as indicated at block 456B, a second computing device of the user may additionally, or alternatively, include the one or more vision components. For instance, the stream of vision data may be generated by the one or more vision components of the second computing device, transmitted to the first computing device, and provided to the system for further processing.

At block 458, the system processes, at the first computing device and using one or more machine learning (ML) models, the stream of vision data to generate a stream of agricultural annotations with respect to the one or more areas of interest. The operations of block 458 of the method 400 of FIG. 4 may be performed in the same or similar manner described with respect to the operations of block 354 of the method 300 of FIG. 3.

At block 460, the system causes the stream of agricultural annotations to be provided for presentation to the user with respect to the one or more areas of interest. For example, the system may cause the stream of agricultural annotations to be provided for presentation to the user via a display of the first computing device. Additionally, or alternatively, the system may transmit the stream of agricultural annotations to the second computing device of the user, and the second computing device of the user may cause the stream of agricultural annotations to be provided for presentation to the user via a display of the second computing device. The system may return to block 456 to continue receiving and processing the stream of vision data through additional iterations of the method 400 of FIG. 4.

At block 462, the system determines whether user input to cause a robot to perform one or more agricultural operations with respect to one or more of the areas of interest has been received. If, at an iteration of block 462, the system determines that user input to cause a robot to perform one or more agricultural operations with respect to one or more of the areas of interest has not been received, then the system may continue monitoring for user input at block 462. If, at an iteration of block 462, the system determines that user input to cause a robot to perform one or more agricultural operations with respect to one or more of the areas of interest has been received, then the system proceeds to block 464. At block 464, the system causes, based on the user input, a robot to perform one or more agricultural operations with respect to one or more of the areas of interest. The operations of blocks 462 and 464 of the method 400 of FIG. 4 may be performed in the same or similar manner described with respect to the operations of blocks 362 and 364 of the method 300 of FIG. 3, respectively.

Although the method 400 of FIG. 4 is primarily described with respect to the system causing the first computing device to perform various operations, it should be understood that is for the sake of example and is not meant to be limiting. For instance, the first computing device may correspond to a mobile computing device of the user (e.g., a mobile phone of the user, a mobile tablet of the user, etc.), or the first computing device may correspond to a wearable computing device that includes an HMD for providing the stream of agricultural annotations for presentation to the user in an augmented reality manner via the HMD. Also, for instance, the second computing device may correspond to a mobile computing device of the user (e.g., a mobile phone of the user, a mobile tablet of the user, etc.), or the second computing device may correspond to a wearable computing device that includes an HMD for providing the stream of agricultural annotations for presentation to the user in an augmented reality manner via the HMD (e.g., the same architecture of computing devices described with respect to the method 300 of FIG. 3). Moreover, although FIG. 4 is described with respect to particular operations, it should be understood that is for the sake of example and is not meant to be limiting. For instance, the method 400 of FIG. 4 may additionally include instances of blocks 356 and 358 to determine whether to prompt the user to reduce a current distance between various computing devices and the one or more areas of interest once the user arrives at the one or more areas of interest based on the directions.

Figure 5A:
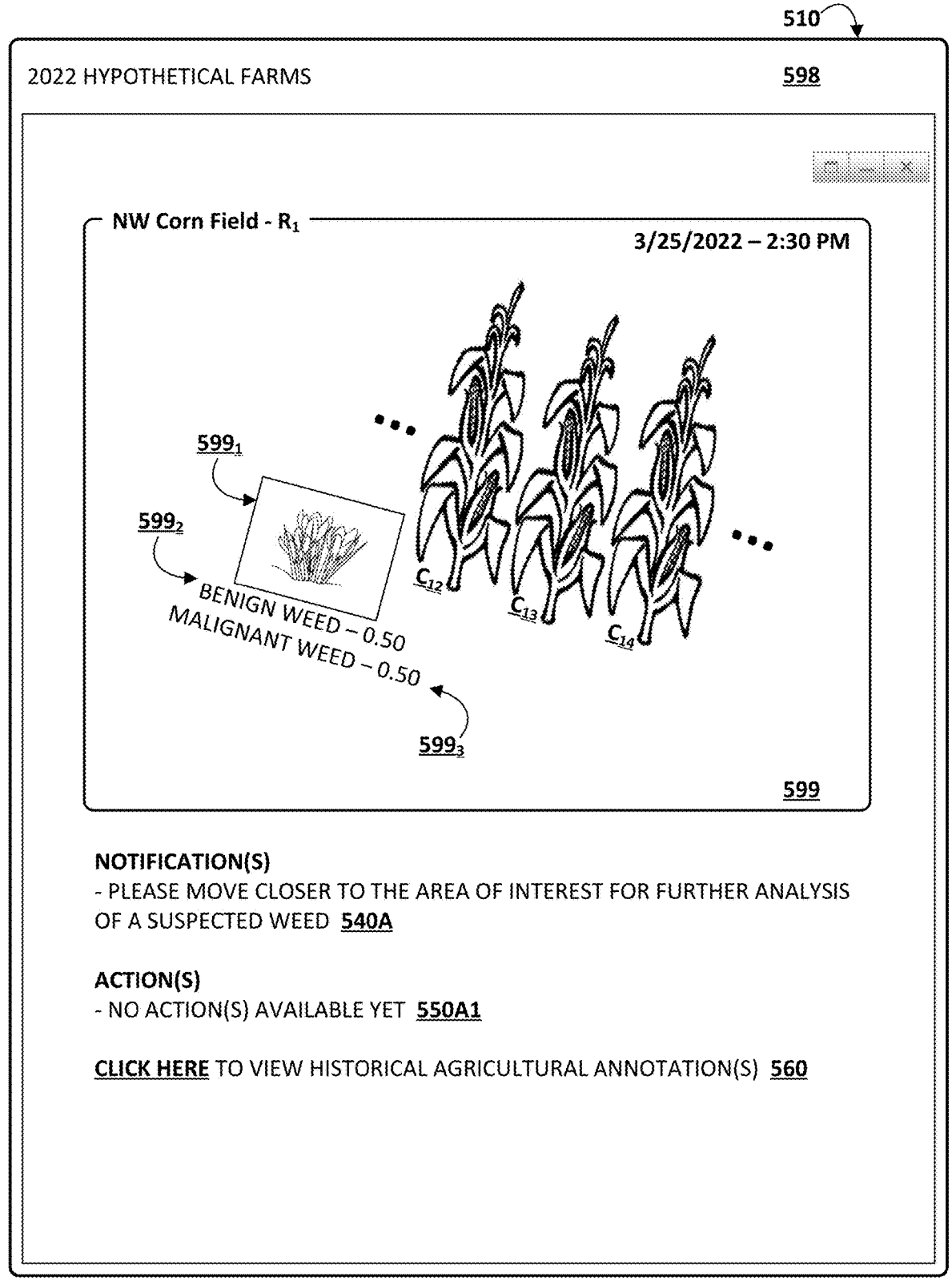
FIG. 5A, FIG. 5B, and FIG. 5C depict various non-limiting examples of a display associated with an augmented reality scouting system, in accordance with various implementations.
Figure 5B:
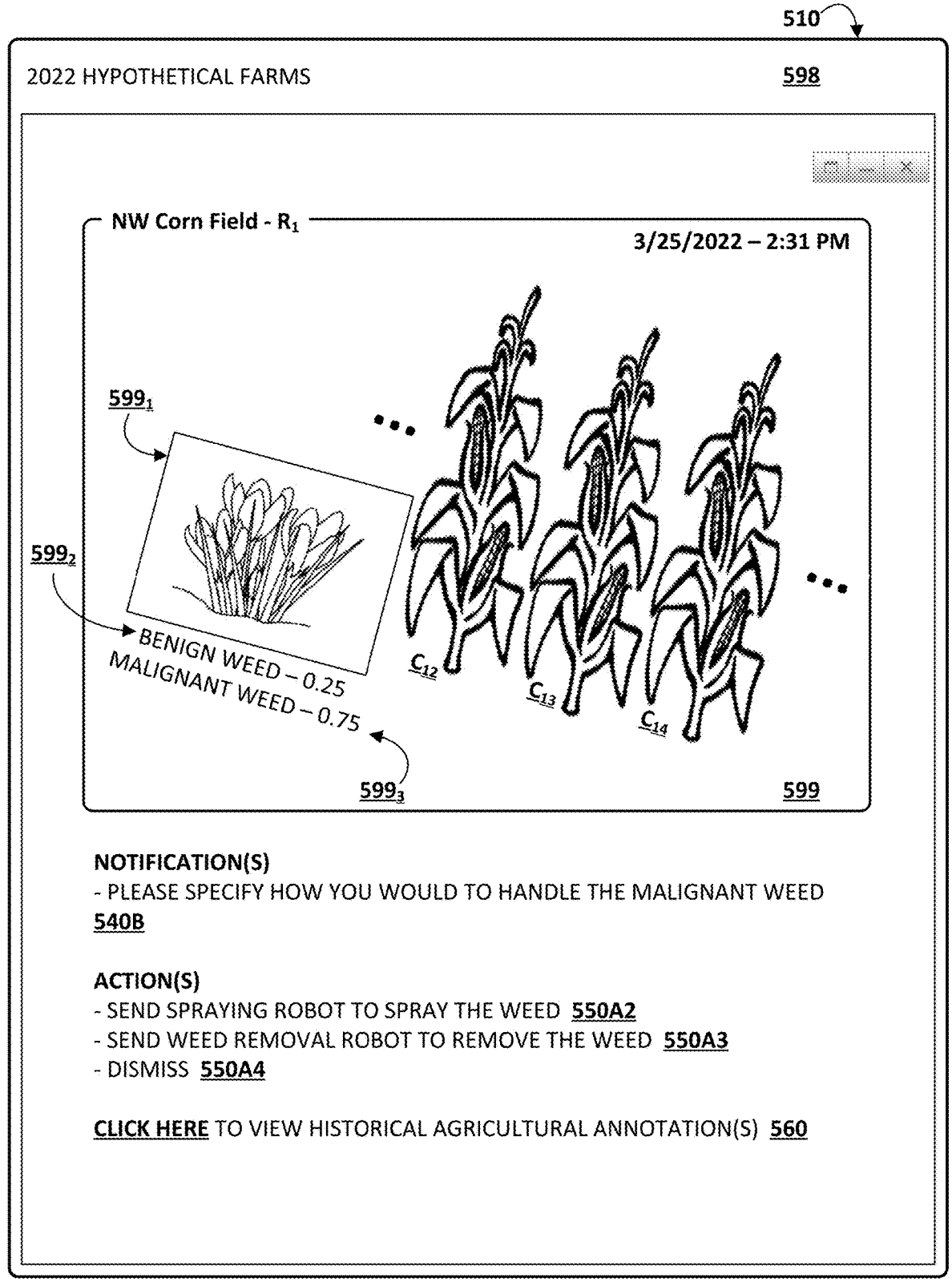
Figure 5C:
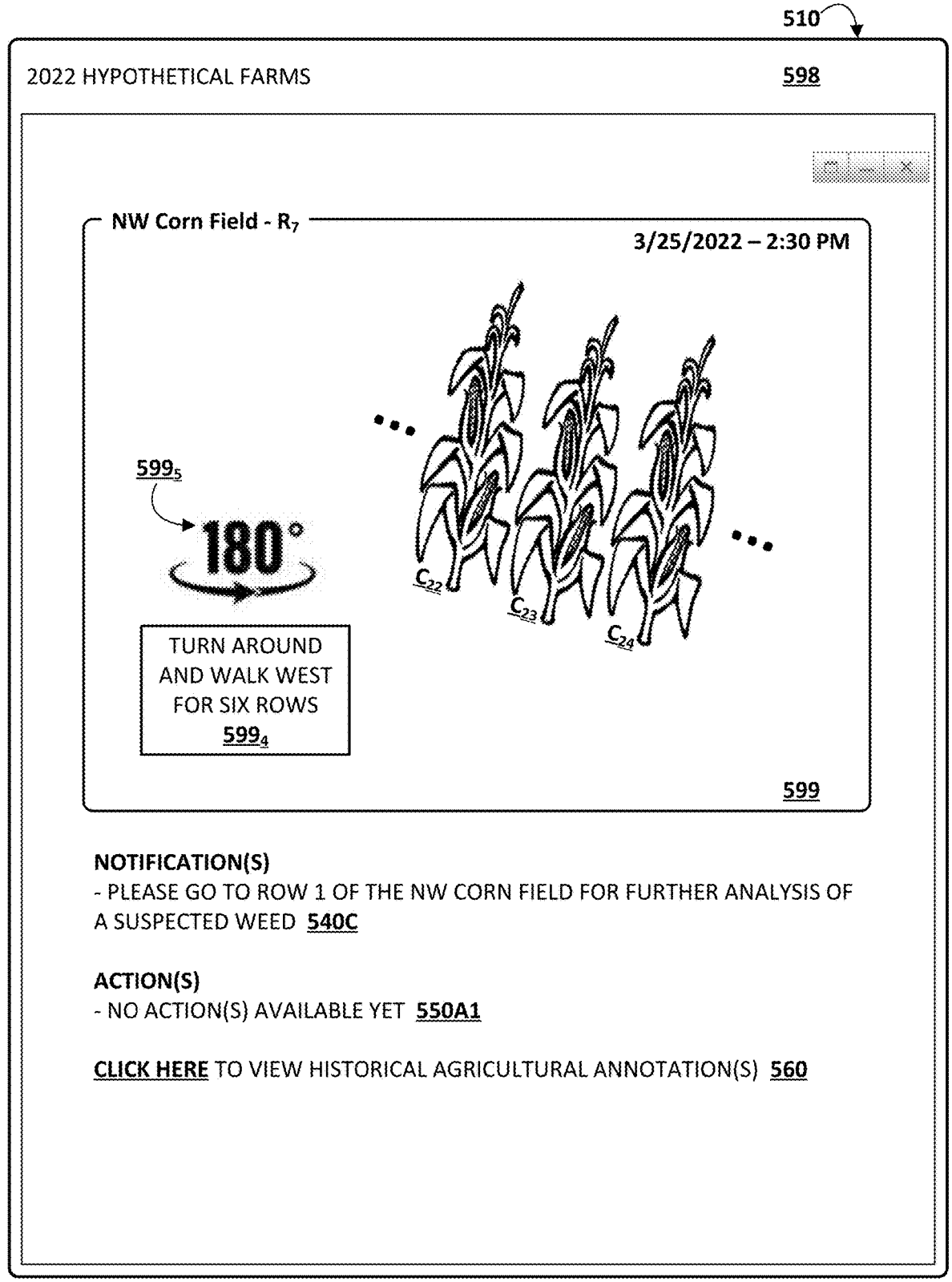

Turning now to FIGS. 5A, 5B, and 5C, various non-limiting examples of a display 598 associated with an augmented reality scouting system (e.g., the augmented reality scouting system 120 of FIG. 1) are depicted at a computing device 510. In some implementations, the display 598 may be provided as a website that is accessible via a web browser of the client device 510. Further, a portion 599 of the display 599 may be dedicated to providing a stream of agricultural annotations with respect to area(s) of interest of an agricultural field for presentation to the user as described herein. In additional or alternative implementations, the display 598 may be provided as part of a software application that operates at the computing device 510 (e.g., mobile phone, mobile tablet, wearable computing device, etc.) using data received/obtained from the augmented reality scouting system. Although the computing device 510 is depicted in FIGS. 5A-5C as a mobile tablet, it should be understood that is for the sake of example and is not meant to be limiting. For example, in instances where the computing device 510 is a wearable computing device that includes a head-mounted display ("HMD") (e.g., computing device $110_N$ as shown in FIGS. 1 and 4), the computing device 510 may operate an augmented reality scouting software application that receives/obtains data from the augmented reality scouting system to provide a user with an immersive experience.

Referring specifically to FIG. 5A, assume that a user is physically present in the agricultural field 200 form FIG. 2, and walking along row 1 $R_1$ of the NW corn field. As the user is walking along row 1 $R_1$ of the NW corn field, one or more vision components of the computing device 510 or an additional computing device of the user, such as a wearable computing device (e.g., an instance of the computing device $110_N$ and as shown in FIG. 2), may generate a stream of vision data. In implementations where the one or more vision components are of the computing device 510, the computing device 510 can cause the stream of vision data to be processed, using inference ML model(s), to generate a stream of agricultural annotations with respect to one or more areas of interest of the agricultural field 200. In implementations where the one or more vision components are of the additional computing device of the user (e.g., one or more vision components of a wearable computing device), the additional computing device can cause the stream of vision data to be processed, using inference ML model(s), to generate the stream of agricultural annotations with respect to the one or more areas of interest of the agricultural field 200, or the additional computing device can cause the stream of vision data to transmitted to the computing device 510 to cause the computing device to generate the stream of agricultural annotations with respect to the one or more areas of interest of the agricultural field 200.

As shown in FIG. 5A, a given area of interest is identified at the base of crop 12 $C_{12}$ of row 1 $R_1$ of the NW corn field based on processing the stream of vision data. The area of interest in FIG. 5A is predicted to include a weed that is identified based on processing to the stream of vision data using, for example, a weed detection ML model that is trained to detect presence and/or types of weeds in the agricultural field 200. In this example, the stream of agricultural annotations generated based on processing the stream of vision data includes a corresponding bounding box $599_1$ that encompasses the weed that is captured in the stream of vision data, corresponding labels $599_2$ of "benign weed" and "malignant weed" that correspond to two potential types of the weed that is captured in the stream of vision data, and corresponding predicted measures $599_3$ of "0.50" and "0.50" for each of the corresponding labels to indicate the augmented reality scouting system has determined there is a 50% chance the weed included in the corresponding bounding box $599_1$ is a benign weed, and a 50% chance the weed included in the corresponding bounding box $599_1$ is a malignant weed. In implementations where the computing device 510 is a wearable computing device and/or in implementations that transmit the stream of agricultural annotations to a wearable computing device, the stream of agricultural annotations can be utilized to augment actual vision of the user via an HMD of the wearable computing device such that it appears, from a perspective of the user, that the stream of agricultural annotations is actually present in the physical environment.

Notably, the corresponding predicted measures $599_3$ included in the stream of agricultural annotations indicate that the augmented reality scouting system is unsure of whether the weed captured in the area of interest is a benign weed or malignant weed (e.g., as indicated by each of these types of weeds being associated with a corresponding predicted measure of 0.50). Accordingly, in this example, a prompt 540A may be provided for presentation to the user in the form of a notification of "please move closer to the area of interest for further analysis of a suspected weed". Notably, at this time instance, no prompt for the user to select one or more agricultural operations to cause a robot to perform with respect to the area of interest may be prompted (e.g., as indicated by 550A1 and the indication of "no action(s) available yet"). In this example, the lack of the prompt in the form of the agricultural operations that may be performed by the robot may be based on the augmented reality scouting system being unsure of whether the weed captured in the area of interest is a benign weed or malignant weed. However, it should be understood that is for the sake of example, and the augmented reality scouting system may still prompt the user to select one or more agricultural operations at this time instance.

Referring specifically to be FIG. 5B, further assume that, responsive to the prompt 540A, the user reduces a current distance with respect to the area of interest. For example, the area of interest and crops shown in the portion 599 of the display 598 are larger (e.g., as compared to FIG. 5A) to indicate that the user has reduced the prior current distance with respect to the area of interest. Notably, as the current distance with respect to the area of interest is reduced, the stream of vision data can be continually processed to update the stream of agricultural annotations. In this example, the corresponding bounding box $599_1$ and the corresponding labels $599_2$ of "benign weed" and "malignant weed" may remain substantially the same. However, the corresponding predicted measures $599_3$ of "0.50" and "0.50" for each of the corresponding labels to indicate the augmented reality scouting system has determined there is a 50% chance the weed included in the corresponding bounding box $599_1$ is a benign weed, and a 50% chance the weed included in the corresponding bounding box $599_1$ is a malignant weed have been dynamically updated.

In particular, based on processing the stream of vision data, the corresponding predicted measure $599_3$ of "0.50" for the benign weed has been updated to "0.25", and the predicted measure $599_3$ of "0.50" for the malignant weed has been updated to "0.75". Put another way, in the example of FIG. 5A, the user is prompted to move closer to the area of interest to obtain vision data that better captures the area of interest. As a result, in the example of FIG. 5B, the augmented reality scouting system is able to more accurately predict object(s) and/or condition(s) that correspond to the area of interest.

Accordingly, based on determining that the weed corresponding to the area of interest is likely a malignant weed, a prompt 540B may be provided for presentation to the user in the form of a notification of "please specify how you would like to handle the malignant weed". Notably, at this time instance, a prompt for the user to select one or more agricultural operations to cause a robot to perform with respect to the area of interest may be prompted. For example, as shown in FIG. 5B, a first prompt 550A2 for the user to "send spraying robot to spray the weed" as a spraying agricultural operation may be provided for presentation to the user, and a second prompt 550A3 for the user to "send weed removal robot to remove the weed" as a weed removal agricultural operation may be provided for presentation to the user. In some implementations, a third prompt 550A4 of "dismiss" may optionally be provided to discuss these prompts. In this example, the robot that is utilized to perform the spraying agricultural operation and the robot that is utilized to perform the weed removal operation may be the same robot or different robots. Notably, these various prompts may be provided for presentation to the user via the display 598 of the computing device 510 and/or via a display of an additional computing device (e.g., an HMD of a wearable computing device of the user).

Further, and assuming that the user provides user input responsive to the prompts to cause a robot to perform one of the agricultural operations described above, the computing device 510 and/or an additional computing device of the user can transmit location data (e.g., GPS data, local mapping data, etc.) associated with the area of interest to the robot. This enables the robot to utilize the location data associated with the area of interest to navigate to the area of interest and perform the selected agricultural operation in an autonomous or semi-autonomous manner. In some implementations, the robot may transmit an indication of the one or more agricultural operations that were performed with respect to the area of interest back to the client device 510 and/or an additional client device of the user to indicate the one or more agricultural operations were completed.

In various implementations, the user may access historical agricultural annotations as indicated by 560. In these implementations, the software application associated with the augmented reality scouting system may enable the user or one or more additional users associated with the agricultural field to view image(s) and/or video(s) from the stream of vision data that include agricultural annotations. This enables the user and/or the one or more additional users to track these agricultural annotations over a duration of time and with respect to various areas of interest. For example, this enables the user and/or the one or more additional users to physically traverse back to the various areas of interest to ensure that the one or more agricultural operations performed with respect to the areas of interest adequately address the object(s) and/or condition(s) corresponding to the areas of interest.

Referring specifically to FIG. 5C, assume that the user is physically present in the agricultural field 200 form FIG. 2, and walking along row 7 $R_7$ of the NW corn field (e.g., as opposed to walking along row 1 $R_1$ of the NW corn field in the examples of FIGS. 5A and 5B). As the user is walking along row 7 $R_7$ of the NW corn field, further assume that a robot (e.g., a rover, a UAV, etc.) identifies an area of interest (e.g., the area of interest of FIGS. 5A and 5B). In this example, the robot can generate and transmit an indication 540C of the area of interest to the computing device 510 and/or an additional computing device of the user (e.g., a wearable computing device). The indication of the area of interest can include location data associated with the area of interest and/or directions from a current location of the user to the area of interest, such as "please go to row 1 of the NW corn field for further analysis of a suspected weed" as indicated by the notification in FIG. 5C.

In some implementations, the directions from the current location of the user to the area of interest can include, for example, textual directions $599_4$ of "turn around and walk west for six rows" to notify the user of how to navigate from the current location to the area of interest. In additional or alternative implementations, the directions from the current location of the user to the area of interest can include, for example, directional cues $599_5$ (e.g., represented by the 180 degrees cue to tell the user to turn around) that are dynamically updated as the user traverses from the current location to the area of interest. Upon arriving at the area of interest, techniques described above with respect to FIGS. 5A and 5B may be utilized to further investigate the area of interest.

Although FIGS. 5A, 5B, and 5C are described with respect to only a single area of interest, it should be understood that is for the sake of example and is not meant to be limiting. For instance, additional, or alternative, areas of interest may be identified in the same stream of vision data, and corresponding streams of agricultural annotations may be generated for each of these areas of interest. Further, although FIGS. 5A, 5B, and 5C are described with respect to the area of interest corresponding to a weed detected in the agricultural field, it should be understood that is also for the sake of example and is not meant to be limiting. For instance, additional, or alternative, inference ML model(s) may be utilized to process the stream of vision data to make corresponding inferences with respect to various object(s) and/or condition(s) that may be present in the agricultural field.

Figure 6:
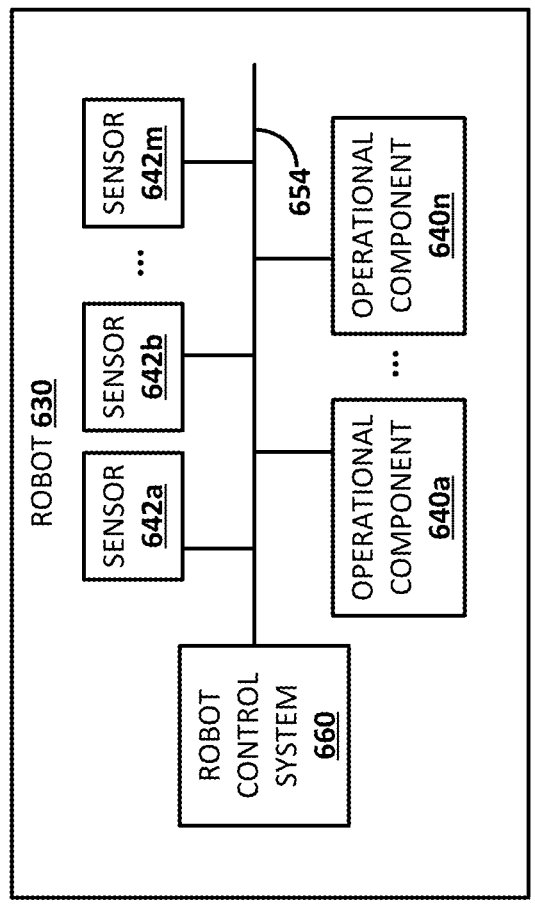
FIG. 6 depicts an example architecture of a robot, in accordance with various implementations.

Turning now to FIG. 6, an example architecture of a robot 630 is schematically depicted. The robot 630 includes a robot control system 660, one or more operational components 640a-640n, and one or more sensors 642a-642m. The sensors 642a-642m may include, for example, vision components, light sensors, pressure sensors, pressure wave sensors (e.g., microphones), proximity sensors, accelerometers, gyroscopes, thermometers, barometers, GPS sensors, IMUs, wheel encoders, and so forth. While sensors 642a-642m are depicted as being integral with robot 630, this is not meant to be limiting. In some implementations, sensors 642a-642m may be located external to robot 630, e.g., as standalone units.

Operational components 640a-640n may include, for example, one or more end effectors and/or one or more servo motors or other actuators to effectuate movement of one or more components of the robot. For example, the robot 630 may have multiple degrees of freedom and each of the actuators may control actuation of the robot 630 within one or more of the degrees of freedom responsive to the control commands. As used herein, the term actuator encompasses a mechanical or electrical device that creates motion (e.g., a motor), in addition to any driver(s) that may be associated with the actuator and that translate received control commands into one or more signals for driving the actuator. Accordingly, providing a control command to an actuator may comprise providing the control command to a driver that translates the control command into appropriate signals for driving an electrical or mechanical device to create desired motion.

The robot control system 660 may be implemented in one or more processors, such as a CPU, GPU, and/or other controller(s) of the robot 630. In some implementations, the robot 630 may comprise a "brain box" that may include all or aspects of the control system 660. For example, the brain box may provide real time bursts of data to the operational components 640a-640n, with each of the real time bursts comprising a set of one or more control commands that dictate, inter alia, the parameters of motion (if any) for each of one or more of the operational components 640a-640n. In some implementations, the robot control system 660 may perform one or more aspects of methods 300 and/or 400 described herein.

As described herein, in some implementations all or aspects of the control commands generated by control system 660 in traversing a robotic component to a particular pose can be based on determining that particular pose is likely to result in successful performance of a task, as determined according to implementations described herein. Although control system 660 is illustrated in FIG. 6 as an integral part of the robot 630, in some implementations, all or aspects of the control system 660 may be implemented in a component that is separate from, but in communication with, robot 630. For example, all or aspects of control system 660 may be implemented on one or more computing devices that are in wired and/or wireless communication with the robot 630, such as computing device 710.

Figure 7:
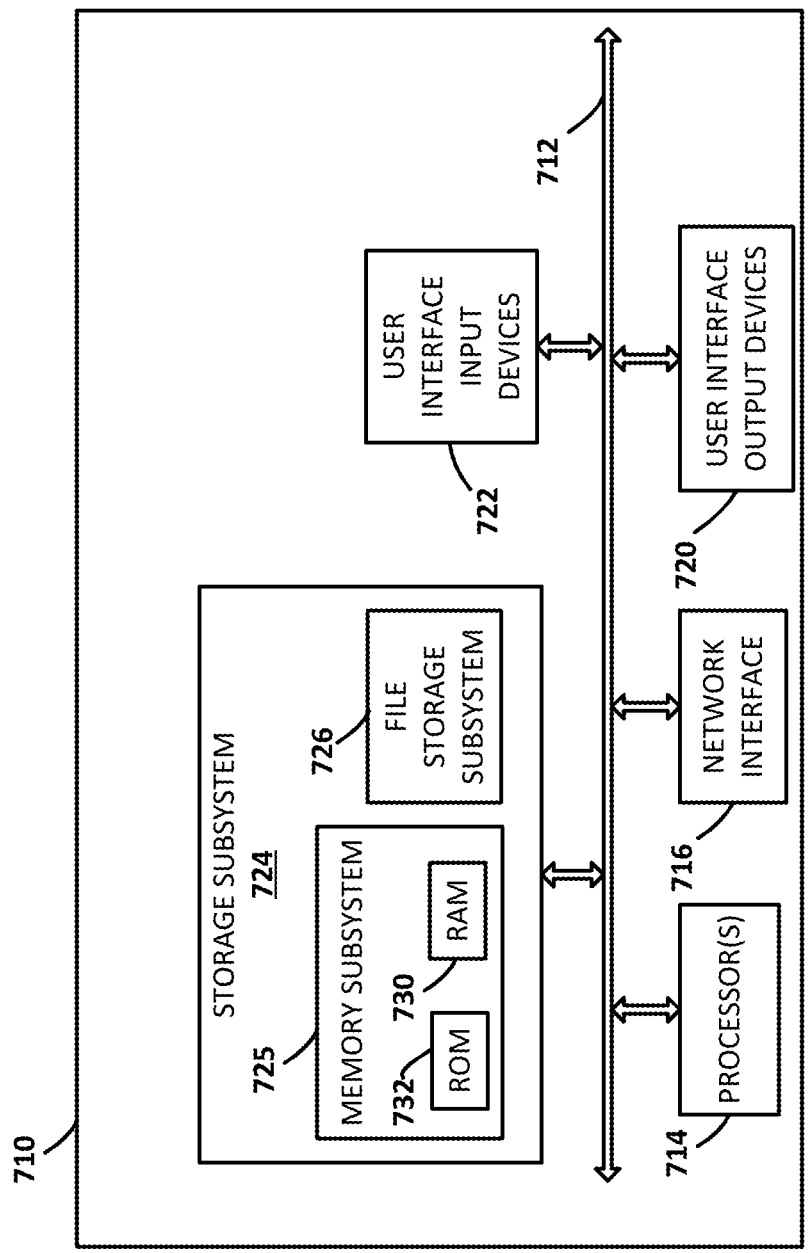
FIG. 7 depicts an example architecture of a computing device, in accordance with various implementations.

Turning now to FIG. 7, a block diagram of an example computing device 710 that may optionally be utilized to perform one or more aspects of techniques described herein is depicted. In some implementations, one or more of a computing device, remote server, and/or other component(s) may comprise one or more components of the example computing device 710.

Computing device 710 typically includes at least one processor 714 which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 716. The input and output devices allow user interaction with computing device 710. Network interface subsystem 716 provides an interface to outside networks and is coupled to corresponding interface devices in other computing devices.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 710 to the user or to another machine or computing device.

Storage subsystem 724 stores programming and data constructs that provide the functionality of some or all of the modules described herein. For example, the storage subsystem 724 may include the logic to perform selected aspects of the methods disclosed herein, as well as to implement various components depicted in FIG. 1.

These software modules are generally executed by processor 714 alone or in combination with other processors. Memory 725 used in the storage subsystem 724 can include a number of memories including a main random-access memory (RAM) 730 for storage of instructions and data during program execution and a read only memory (ROM) 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computing device 710 communicate with each other as intended. Although bus subsystem 712 is shown schematically as a single bus, alternative implementations of the bus subsystem 712 may use multiple busses.

Computing device 710 can be of varying types including a workstation, server, computing cluster, blade server, server farm, or any other data processing system or computing device. Due to the ever-changing nature of computers and networks, the description of computing device 710 depicted in FIG. 7 is intended only as a specific example for purposes of illustrating some implementations. Many other configurations of computing device 710 are possible having more or fewer components than the computing device depicted in FIG. 7.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method implemented by one or more processors is provided, and includes receiving, at a mobile computing device of a user, a stream of vision data, the stream of vision data being generated by one or more vision components of a wearable computing device of the user; processing, at the mobile computing device, and using one or more inference machine learning models, the stream of vision data to generate a stream of agricultural annotations with respect to an area of interest of an agricultural field that is captured in the stream of vision data; and transmitting, to the wearable computing device, the stream of agricultural annotations. Transmitting the stream of agricultural annotations to the wearable computing device causes the wearable computing device to provide, for presentation to the user via a head-mounted display (HMD) of the wearable computing device, the stream of agricultural annotations with respect to the area of interest.

These and other implementations of technology disclosed herein can optionally include one or more of the following features.

In some implementations, transmitting the stream of agricultural annotations to the wearable computing device may cause the wearable computing device to augment the area of interest with the stream of agricultural annotations via the HMD of the wearable computing device.

In some versions of those implementations, each agricultural annotation, included in the stream of agricultural annotations, may include a corresponding bounding box that encompasses the area of interest. In these implementations, transmitting the stream of agricultural annotations to the wearable computing device may cause the wearable computing device to augment the area of interest with the corresponding bounding box that encompasses the area of interest via the HMD of the wearable computing device.

In additional or alternative versions of those implementations, each agricultural annotation, included in the stream of agricultural annotations, may be associated with a corresponding predicted measure. In these implementations, transmitting the stream of agricultural annotations to the wearable computing device may additionally, or alternatively, cause the wearable computing device to augment the area of interest with the corresponding predicted measure via the HMD of the wearable computing device.

In additional or alternative versions of those implementations, each agricultural annotation, included in the stream of agricultural annotations, may be associated with a corresponding label. In these implementations, transmitting the stream of agricultural annotations to the wearable computing device may additionally, or alternatively, cause the wearable computing device to augment the area of interest with the corresponding label via the HMD of the wearable computing device.

In some implementations, the method may further include determining, based on the stream of agricultural annotations, whether to prompt the user to cause a robot to perform one or more agricultural operations with respect to the area of interest; and in response to determining to prompt the user to cause the robot to perform the one or more agricultural operations with respect to the area of interest: presenting, at a display of the mobile computing device or the HMD of the wearable computing device, a prompt that, when selected by the user, causes the robot to perform the one or more agricultural operations with respect to the area of interest.

In some versions of those implementations, the method may further include, in response to receiving a user input responsive to the prompt: determining, based on the user input, the one or more agricultural operations to be performed with respect to the area of interest; determining, at the mobile computing device, location data associated with the area of interest; and transmitting, to the robot, an indication of the one or more agricultural operations to be performed with respect to the area of interest and the location data associated with the area of interest.

In some further versions of those implementations, the one or more agricultural operations may include one or more of: a spraying agricultural operation, a weeding agricultural operation, a harvesting agricultural operation, an irrigation agricultural operation, a mowing agricultural operation, a pruning agricultural operation, and/or a seeding agricultural operation.

In some implementations, the stream of vision data may capture a field of view of the one or more vision components of the wearable computing device, and the area of interest may be a subset of the field of view of the one or more vision components of the wearable computing device.

In some implementations, the mobile computing device may be a mobile phone of the user, a mobile tablet of the user, or a laptop of the user.

In some implementations, the one or more inference machine learning models may include one or more of: a weed detection machine learning model that is trained to detect presence of weeds in the agricultural field; a pest detection machine learning model that is trained to detect presence of pests in the agricultural field; a growth-stage classifier machine learning model that is trained to classify plant-parts-of-interest into stages of growth; a disease detection machine learning model that is trained to detect presence of one or more diseases of one or more crops in the agricultural field; and/or a crop yield prediction machine learning model that is trained to predict crop yield of one or more crops in the agricultural field.

In some implementations, a method implemented by one or more processors is provided, and includes receiving, at a mobile computing device of a user, a stream of vision data, the stream of vision data being generated by one or more vision components of a wearable computing device of the user; processing, at the mobile computing device, and using one or more inference machine learning models, the stream of vision data to generate a stream of agricultural annotations with respect to an area of interest of an agricultural field that is captured in the stream of vision data; determining, based on the corresponding predicted measure associated with a given agricultural annotation included in the stream of agricultural annotations, whether to prompt the user to reduce a current distance between the area of interest and the wearable computing device; and in response to determining to prompt the user to reduce the current distance between the area of interest and the wearable computing device: generating, at the mobile computing device, a prompt that notifies the user to reduce the current distance between the area of interest and the wearable computing device; and transmitting, to the wearable computing device, the prompt. Transmitting the prompt to the wearable computing device causes the wearable computing device to provide, for presentation to the user via a head-mounted display (HMD) of the wearable computing device, the prompt.

These and other implementations of technology disclosed herein can optionally include one or more of the following features.

In some implementations, determining to prompt the user to reduce the current distance between the area of interest and the wearable computing device may include determining that the corresponding predicted measure associated with the given agricultural annotation included in the stream of agricultural annotations fails to satisfy a predicted measure threshold.

In some versions of those implementations, the method may further include transmitting, to the wearable computing device, the stream of agricultural annotations along with the prompt. Transmitting the stream of agricultural annotations to the wearable computing device may additionally, or alternatively, cause the wearable computing device to provide, for presentation to the user via the HMD of the wearable computing device and along with the prompt, the stream of agricultural annotations with respect to the area of interest.

In some further versions of those implementations, transmitting the stream of agricultural annotations to the wearable computing device may additionally, or alternatively, cause the wearable computing device to augment the area of interest with the stream of agricultural annotations via the HMD of the wearable computing device.

In some implementations, a method implemented by one or more processors is provided, and includes receiving an indication of an area of interest of an agricultural field, the indication of the area of interest being received from an unmanned aerial vehicle (UAV) that is flying over the agricultural field; receiving, at a mobile computing device of the user, a stream of vision data, the stream of vision data being generated by one or more vision components of a wearable computing device of the user; processing, at the mobile computing device, and using one or more inference machine learning models, the stream of vision data to generate a stream of agricultural annotations with respect to the area of interest, the area of interest being captured in the stream of vision data; and causing the stream of agricultural annotations to be provided for presentation to the user with respect to the area of interest via a head-mounted display (HMD) of the wearable computing device.

These and other implementations of technology disclosed herein can optionally include one or more of the following features.

In some implementations, the indication of the area of interest may include directions from a current location of the first computing device to the area of interest.

In some versions of those implementations, the method may further include causing the directions from the current location of the first computing device to the area of interest to be provided for presentation to the user via the HMD of the wearable computing device.

In some implementations, causing the stream of agricultural annotations to be provided for presentation to the user with respect to the area of interest may include causing the HMD of the wearable computing device to augment the area of interest with the stream of agricultural annotations.

In some implementations, the indication of the area of interest may be received via the mobile computing device or the wearable computing device.

In addition, some implementations include one or more processors (e.g., central processing unit(s) (CPU(s)), graphics processing unit(s) (GPU(s)), and/or tensor processing unit(s) (TPU(s)) of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods. Some implementations also include a computer program product including instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

What is claimed is:

1. A method implemented by one or more processors, the method comprising:
receiving, at a mobile computing device of a user, a stream of vision data, the stream of vision data being generated by one or more vision components of a wearable computing device of the user;
   processing, at the mobile computing device, and using one or more inference machine learning models, the stream of vision data to generate a stream of agricultural annotations with respect to an area of interest of an agricultural field that is captured in the stream of vision data, the stream of agricultural annotations to include a label and a predicted measure indicative of a likelihood that the area of interest includes an item corresponding to the label, wherein the item corresponds to the label when the predicted measure surpasses a predicted measure threshold;
   transmitting, to the wearable computing device, the stream of agricultural annotations, wherein transmitting the stream of agricultural annotations to the wearable computing device causes the wearable computing device to provide, for presentation to the user via a head mounted display (HMD) of the wearable computing device, the stream of agricultural annotations with respect to the area of interest; and
   transmitting, to the wearable computing device, a prompt to the user to reduce a current distance between the area of interest and the wearable computing device, wherein transmitting the prompt to the wearable computing device causes the wearable computing device to provide, for presentation to the user via the HMD of the wearable computing device, the prompt, and wherein the prompt is based on the predicted measure associated with a given agricultural annotation included in the stream of agricultural annotations.

2. The method of claim 1, wherein transmitting the stream of agricultural annotations to the wearable computing device causes the wearable computing device to augment the area of interest with the stream of agricultural annotations via the HMD of the wearable computing device.

3. The method of claim 2, wherein each agricultural annotation, included in the stream of agricultural annotations, includes a corresponding bounding box that encompasses the area of interest, and wherein transmitting the stream of agricultural annotations to the wearable computing device causes the wearable computing device to augment the area of interest with the corresponding bounding box that encompasses the area of interest via the HMD of the wearable computing device.

4. The method of claim 2, wherein each agricultural annotation, included in the stream of agricultural annotations, is associated with a corresponding predicted measure, and wherein transmitting the stream of agricultural annotations to the wearable computing device causes the wearable computing device to augment the area of interest with the corresponding predicted measure via the HMD of the wearable computing device.

5. The method of claim 2, wherein each agricultural annotation, included in the stream of agricultural annotations, is associated with a corresponding label, and wherein transmitting the stream of agricultural annotations to the wearable computing device causes the wearable computing device to augment the area of interest with the corresponding label via the HMD of the wearable computing device.

6. The method of claim 1, further comprising including:
   determining, based on the stream of agricultural annotations, whether to prompt the user to cause a robot to perform one or more agricultural operations with respect to the area of interest; and
   in response to determining to prompt the user to cause the robot to perform the one or more agricultural operations with respect to the area of interest, presenting, at a display of the mobile computing device or the HMD of the wearable computing device, a prompt that, when selected by the user, causes the robot to perform the one or more agricultural operations with respect to the area of interest.

7. The method f claim 6, further including:
   in response to receiving a user input responsive to the prompt:
     determining, based on the user input, the one or more agricultural operations to be performed with respect to the area of interest;
     determining, at the mobile computing device, location data associated with the area of interest; and
     transmitting, to the robot, an indication of the one or more agricultural operations to be performed with respect to the area of interest and the location data associated with the area of interest.

8. The method of claim 6, wherein the one or more agricultural operations include one or more of: a spraying agricultural operation, a weeding agricultural operation, a harvesting agricultural operation, an irrigation agricultural operation, a mowing agricultural operation, a pruning agricultural operation, or a seeding agricultural operation.

9. The method of claim 1, wherein the stream of vision data captures a field of view of the one or more vision components of the wearable computing device, and wherein the area of interest is a subset of the field of view of the one or more vision components of the wearable computing device.

10. The method of claim 1, wherein the mobile computing device is a mobile phone of the user, a mobile tablet of the user, or a laptop of the user.

11. The method of claim 1, wherein the one or more inference machine learning models include one or more of:
- a weed detection machine learning model that is trained to detect presence of weeds in the agricultural field;
- a pest detection machine learning model that is trained to detect presence of pests in the agricultural field;
- a growth-stage classifier machine learning model that is trained to classify plant-parts-of-interest into stages of growth;
- a disease detection machine learning model that is trained to detect presence of one or more diseases of one or more crops in the agricultural field; and
- a crop yield prediction machine learning model that is trained to predict crop yield of one or more crops in the agricultural field.

12. A method implemented by one or more processors, the method comprising:
- receiving, at a mobile computing device of a user, a stream of vision data, the stream of vision data being generated by one or more vision components of a wearable computing device of the user;
- processing, at the mobile computing device, and using one or more inference machine learning models, the stream of vision data to generate a stream of agricultural annotations with respect to an area of interest of an agricultural field that is captured in the stream of vision data, the stream of agricultural annotations to include a label and a predicted measure indicative of a likelihood that the area of interest includes an item corresponding to the label, wherein the item corresponds to the label when the predicted measure surpasses a predicted measure threshold;
- determining, based on the predicted measure associated with a given agricultural annotation included in the stream of agricultural annotations, whether to prompt the user to reduce a current distance between the area of interest and the wearable computing device; and
- in response to determining to prompt the user to reduce the current distance between the area of interest and the wearable computing device:
  - generating, at the mobile computing device, a prompt that notifies the user to reduce the current distance between the area of interest and the wearable computing device; and
  - transmitting, to the wearable computing device, the prompt, wherein transmitting the prompt to the wearable computing device causes the wearable computing device to provide, for presentation to the user via a head-mounted display (HMD) of the wearable computing device, the prompt.

13. The method of claim 12, wherein determining to prompt the user to reduce the current distance between the area of interest and the wearable computing device includes determining that the predicted measure associated with the given agricultural annotation included in the stream of agricultural annotations fails to satisfy the predicted measure threshold.

14. The method of claim 13, further including transmitting, to the wearable computing device, the stream of agricultural annotations along with the prompt, wherein transmitting the stream of agricultural annotations to the wearable computing device causes the wearable computing device to provide, for presentation to the user via the HMD of the wearable computing device and along with the prompt, the stream of agricultural annotations with respect to the area of interest.

15. The method of claim 14, wherein transmitting the stream of agricultural annotations to the wearable computing device causes the wearable computing device to augment the area of interest with the stream of agricultural annotations via the HMD of the wearable computing device.

16. A method implemented by one or more processors, the method comprising:
- receiving an indication of an area of interest of an agricultural field, the indication of the area of interest being received from an unmanned aerial vehicle (UAV) that is flying over the agricultural field;
- receiving, at a mobile computing device of a user, a stream of vision data, the stream of vision data being generated by one or more vision components of a wearable computing device of the user;
- processing, at the mobile computing device, and using one or more inference machine learning models, the stream of vision data to generate a stream of agricultural annotations with respect to the area of interest, the area of interest being captured in the stream of vision data, the stream of agricultural annotations to include a label and a predicted measure indicative of a likelihood that the area of interest includes an item corresponding to the label, wherein the item corresponds to the label when the predicted measure surpasses a predicted measure threshold;
- causing the stream of agricultural annotations to be provided for presentation to the user with respect to the area of interest via a head-mounted display (HMD) of the wearable computing device; and
- causing a prompt to be provided for presentation to the user with respect to the area of interest via the HMD of the wearable computing device, wherein the prompt includes a notification to the user to reduce a current distance between the area of interest and the wearable computing device, and wherein the prompt is based on the predicted measure associated with a given agricultural annotation included in the stream of agricultural annotations.

17. The method of claim 16, wherein the indication of the area of interest includes directions from a current location of the mobile computing device to the area of interest.

18. The method of claim 17, further including causing the directions from the current location of the mobile computing device to the area of interest to be provided for presentation to the user via the HMD of the wearable computing device.

19. The method of claim 16, wherein causing the stream of agricultural annotations to be provided for presentation to the user with respect to the area of interest includes causing the HMD of the wearable computing device to augment the area of interest with the stream of agricultural annotations.

20. The method of claim 16, wherein the indication of the area of interest is received via the mobile computing device or the wearable computing device.

* * * * *

UNITED STATES PATENT AND TRADEMARK OFFICE
CERTIFICATE OF CORRECTION

PATENT NO. : 12,280,870 B2  
APPLICATION NO. : 17/717845  
DATED : April 22, 2025  
INVENTOR(S) : Grant et al.

Page 1 of 1

It is certified that error appears in the above-identified patent and that said Letters Patent is hereby corrected as shown below:

In the Specification

In Column 28, Claim 6, Line 34, delete "comprising".

In Column 28, Claim 7, Line 47, delete "f" and insert --of--.

Signed and Sealed this  
Twenty-seventh Day of May, 2025

Coke Morgan Stewart  
*Acting Director of the United States Patent and Trademark Office*